US012155124B2

United States Patent
Jo et al.

(10) Patent No.: US 12,155,124 B2
(45) Date of Patent: Nov. 26, 2024

(54) ELECTRONIC DEVICE HAVING AN ANTENNA

(71) Applicant: SAMSUNG ELECTRONICS CO., LTD., Suwon-si (KR)

(72) Inventors: Jaehoon Jo, Suwon-si (KR); Hosaeng Kim, Suwon-si (KR); Seongjin Park, Suwon-si (KR); Sumin Yun, Suwon-si (KR); Woomin Jang, Suwon-si (KR); Jehun Jong, Suwon-si (KR); Jinwoo Jung, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 44 days.

(21) Appl. No.: 18/095,158

(22) Filed: Jan. 10, 2023

(65) Prior Publication Data
US 2023/0163484 A1   May 25, 2023

Related U.S. Application Data

(63) Continuation of application No. PCT/KR2022/009409, filed on Jun. 30, 2022.

(30) Foreign Application Priority Data

Jul. 2, 2021  (KR) ......................... 10-2021-0087133

(51) Int. Cl.
*H01Q 21/06* (2006.01)
*H01Q 9/04* (2006.01)

(52) U.S. Cl.
CPC ......... *H01Q 21/065* (2013.01); *H01Q 9/0407* (2013.01)

(58) Field of Classification Search
CPC ........ H01Q 1/243; H01Q 1/38; H01Q 9/0407; H01Q 9/285; H01Q 21/065; H01Q 21/08; H01Q 21/28; H04M 1/02; H04M 1/0249
See application file for complete search history.

(56) References Cited

U.S. PATENT DOCUMENTS 10,868,362 B2   12/2020   Yun et al.
10,931,000 B1   2/2021   Kang et al.
(Continued)

FOREIGN PATENT DOCUMENTS

CN   101449423 A   6/2009
JP   08293717 A    11/1996
(Continued)

OTHER PUBLICATIONS

International Search Report and Written Opinion for International Application No. PCT/KR2022/009409; International Filing Date Jun. 30, 2022; Date of Mailing Oct. 13, 2022; 62 Pages.
(Continued)

*Primary Examiner* — Raymond R Chai
(74) *Attorney, Agent, or Firm* — CANTOR COLBURN LLP

(57) ABSTRACT

An electronic device according to various embodiments includes a mmWave antenna module including a plurality of first antenna elements disposed on a first surface that is oriented in a first direction, a first coupling unit that protrudes in a second direction from a second surface that is perpendicular to the first surface and is oriented in the second direction, and an RFIC disposed on a third surface oriented in a third direction opposite to the first direction. The electronic device also includes an antenna structure including a plurality of second antenna elements and a second coupling unit protruding from one surface of the antenna structure; a connection member electrically connected to at least one of the first coupling unit and the second coupling unit; a main PCB electrically connected to the mmWave antenna module; and a wireless communication circuit disposed on the main PCB.

22 Claims, 38 Drawing Sheets

(56) References Cited

U.S. PATENT DOCUMENTS

| | | |
|---|---|---|
| 11,011,828 B2 | 5/2021 | Park et al. |
| 11,121,468 B2 | 9/2021 | Dalmia et al. |
| 11,202,364 B2 | 12/2021 | Hong et al. |
| 11,296,422 B2 | 4/2022 | Van Wonterghem et al. |
| 11,477,879 B2 | 10/2022 | Han |
| 12,057,619 B2 | 8/2024 | Jeon et al. |
| 2012/0242547 A1 | 9/2012 | Fujii et al. |
| 2019/0267710 A1 | 8/2019 | Jenwatanavet et al. |
| 2019/0319341 A1* | 10/2019 | Park ............ H01Q 21/065 |
| 2019/0327834 A1 | 10/2019 | Kim et al. |
| 2019/0372229 A1* | 12/2019 | Dalmia ............ H01Q 3/01 |
| 2020/0021015 A1* | 1/2020 | Yun ............ H01Q 1/2283 |
| 2020/0381843 A1 | 12/2020 | Murata et al. |
| 2020/0403316 A1 | 12/2020 | Dalmia et al. |
| 2021/0036434 A1 | 2/2021 | Yeom et al. |
| 2021/0249783 A1* | 8/2021 | Van Wonterghem ............ H01Q 21/0025 |
| 2021/0391641 A1* | 12/2021 | Son ............ H04B 1/40 |
| 2022/0200640 A1* | 6/2022 | Kim ............ H01Q 1/243 |
| 2023/0155610 A1 | 5/2023 | Lee et al. |

FOREIGN PATENT DOCUMENTS

| | | | |
|---|---|---|---|
| JP | 5408166 B2 | 2/2014 | |
| KR | 20190119954 A | 10/2019 | |
| KR | 20200007377 A | 1/2020 | |
| KR | 20200028256 A | 3/2020 | |
| KR | 20200101814 A | 8/2020 | |
| KR | 20210015563 A | 2/2021 | |
| KR | 20210017066 A | 2/2021 | |
| KR | 20210020450 A | 2/2021 | |
| WO | 2007136182 A1 | 11/2007 | |
| WO | WO-2019221526 A1 * | 11/2019 | ............ H01Q 1/243 |
| WO | 2020013449 A1 | 1/2020 | |
| WO | 2020153694 A1 | 7/2020 | |
| WO | 2020177846 A1 | 9/2020 | |

OTHER PUBLICATIONS

European Search Report Issued In EP Application No. 22833661.6-1201, Mail Date Oct. 7, 2024, 9 Pages.

* cited by examiner

ELECTRONIC DEVICE HAVING AN ANTENNA

CROSS-REFERENCE TO RELATED APPLICATION(S)

This application is a continuation application, claiming priority under § 365(c), of an International Application No. PCT/KR2022/009409, filed on Jun. 30, 2022, which is based on and claims the benefit of a Korean patent application number 10-2021-0087133, filed on Jul. 2, 2021, in the Korean Intellectual Property Office, the disclosure of which is incorporated by reference herein in its entirety.

TECHNICAL FIELD

Embodiments disclosed herein relate to an electronic device including an antenna.

BACKGROUND ART

An electronic device may include a plurality of printed circuit boards (PCBs) in order to mount a plurality of electronic components thereon. The plurality of printed circuit boards may be electrically connected via wires or physically connected via a conductive adhesive member. In an example, the plurality of printed circuit boards may be electrically connected to each other via a flexible printed circuit board (FPCB).

In addition, an electronic device performing wireless communication in a frequency band of 20 GHz or higher may include an antenna module including a printed circuit board and a plurality of antenna elements provided on the printed circuit board.

Technical Problem

An antenna module including a plurality of PCBs on which antenna elements are disposed and an FPCB for interconnecting the plurality of PCBs is produced in the state in which the FPCB for interconnecting the plurality of PCBs is bonded to each of the PCBs. Therefore, when the shape of the electronic device including the antenna module is changed, it may be necessary to newly manufacture the antenna module, which may result in an increase in production cost.

SUMMARY

Technical Solution

Various embodiments disclosed herein may include an electronic device that includes an antenna module including a coupling unit and a coupling member capable of being coupled to the coupling unit.

An electronic device according to various embodiments includes a mmWave antenna module including a plurality of first antenna elements disposed on a first surface that is oriented in a first direction, a first coupling unit that protrudes in a second direction from a second surface that is perpendicular to the first surface and is oriented in the second direction, and an RFIC disposed on a third surface oriented in a third direction opposite to the first direction. The electronic device also includes an antenna structure including a plurality of second antenna elements and a second coupling unit protruding from one surface of the antenna structure; a connection member electrically connected to at least one of the first coupling unit and the second coupling unit; a main PCB electrically connected to the mmWave antenna module; and a wireless communication circuit disposed on the main PCB. The antenna structure is electrically connected to the mmWave antenna module via the connection member, and the wireless communication circuit is configured to perform wireless communication by using at least one of the mmWave antenna module and the antenna structure.

An electronic device according to various embodiments includes a mmWave antenna module including a plurality of second antenna elements, a first coupling unit protruding from one surface, and an RFIC; an antenna structure including a plurality of second antenna elements disposed on a first surface that is oriented in a first direction, a second coupling unit that protrudes in a second direction from a second surface that is perpendicular to the first surface and is oriented in the second direction, and a key structure disposed on the first surface; a connection member electrically connected to at least one of the first coupling unit and the second coupling unit; a main PCB electrically connected to the mmWave antenna module; and a wireless communication circuit disposed on the main PCB. The antenna structure is electrically connected to the mmWave antenna module via the connection member, and the wireless communication circuit is configured to perform wireless communication by using at least one of the mmWave antenna module and the antenna structure.

Advantageous Effects

According to various embodiments of the disclosure, an FPCB and an antenna module may be coupled to each other by providing a coupling unit in at least one antenna module.

In addition, when the structure or position in which the antenna module is disposed in the electronic device is changed, only the FPCB may be newly manufactured and used by being coupled to the coupling unit included in the antenna module.

Accordingly, it is possible to reduce the manufacturing cost and time required for newly manufacturing the antenna module.

In addition, various effects directly or indirectly identified through the disclosure may be provided.

MODE FOR INVENTION

Hereinafter, various embodiments of the disclosure will be described with reference to the accompanying drawings. However, it shall be understood that it is not intended to limit the disclosure to specific embodiments and that the disclosure includes various modifications, equivalents, or alternatives of the embodiments of the disclosure.

Figure 1A:
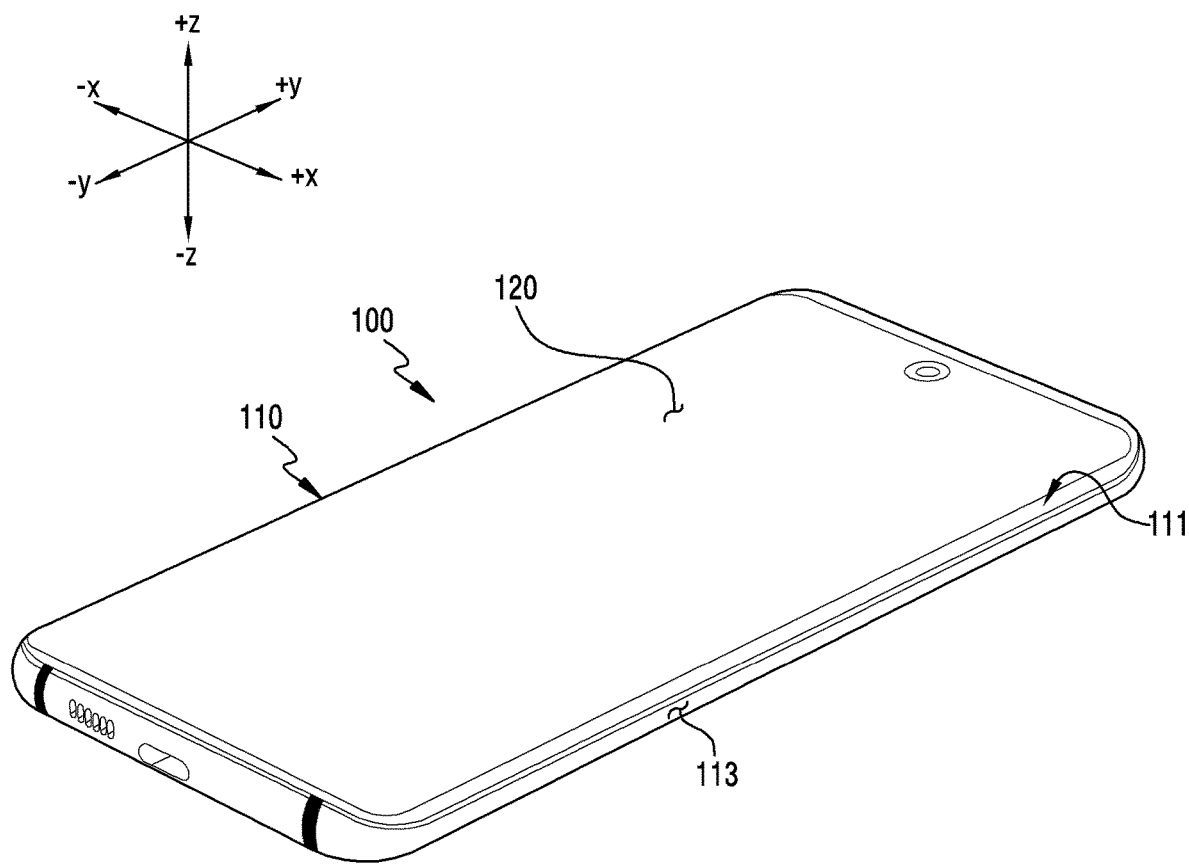
FIG. 1A is a perspective view illustrating a front surface of an electronic device according to various embodiments.
Figure 1B:
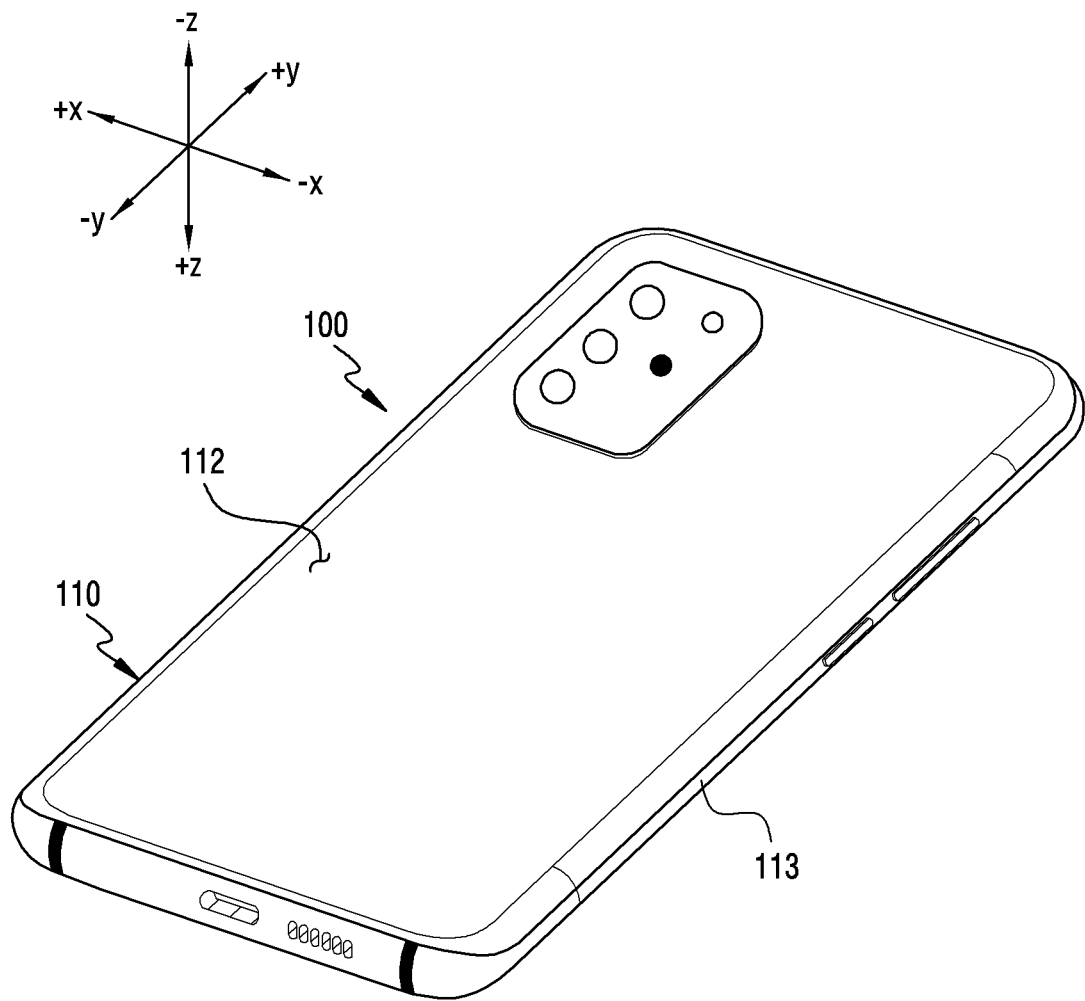
FIG. 1B is a perspective view illustrating a rear surface of the electronic device according to various embodiments.

FIG. 1A is a perspective view illustrating a front surface of an electronic device 100 (e.g., a surface of the electronic device 100 of FIG. 1A located in the +z-direction) according to various embodiments. FIG. 1B is a perspective view illustrating a rear surface of an electronic device 100 (e.g., a surface of the electronic device 100 of FIG. 1A located in the −z-direction) according to various embodiments.

Referring to FIGS. 1A and 1B, the electronic device 100 may include a housing 110, and the housing 110 may include a front plate 111, a rear plate 112, and a side member 113 surrounding the space between the front plate 111 and the rear plates 112.

In an embodiment, a display 120 may be disposed on the front plate 111 of the housing 110. In an example, the display 120 may occupy most of the front surface of the electronic device 100 (e.g., the surface located in the +z-direction of the electronic device 100 of FIG. 1A).

According to an embodiment, the rear plate 112 may be formed of, for example, coated or colored glass, ceramic, polymer, metal (e.g., aluminum, stainless steel (STS), or magnesium), or a combination of two or more of these materials. According to an embodiment, the rear plate 112 may include a curved portion that is bent toward the side member 113 from at least one end and extends seamlessly.

According to an embodiment, the side member 113 may be coupled to the rear plate 112 and may include a metal and/or a polymer. According to an embodiment, the rear plate 112 and the side member 113 may be configured integrally and may include the same material (e.g., a metal material such as aluminum).

According to an embodiment, a conductive portion of the side member 113 may be electrically connected to a wireless communication circuit to operate as an antenna radiator for transmitting and/or receiving a radio frequency (RF) signal of a predetermined frequency band. According to an embodiment, the wireless communication circuit may transmit an RF signal of the predetermined frequency band to the conductive portion of the side member 113 or receive an RF signal of the predetermined frequency band from the conductive portion.

The electronic device 100 illustrated in FIGS. 1A and 1B correspond to an example and do not limit the shape of the device to which the technical idea disclosed herein is applied. The technical idea disclosed herein is applicable to various user devices including a portion capable of operating as an antenna radiator. For example, by adopting a flexible display and a hinge structure, the technical idea disclosed herein may also be applicable to a foldable electronic device that is foldable in a horizontal direction or a foldable in a vertical direction, a tablet computer, or a notebook computer.

Hereinafter, various embodiments will be described with reference to the electronic device 100 illustrated in FIGS. 1A and 1B for convenience of description.

Figure 2:
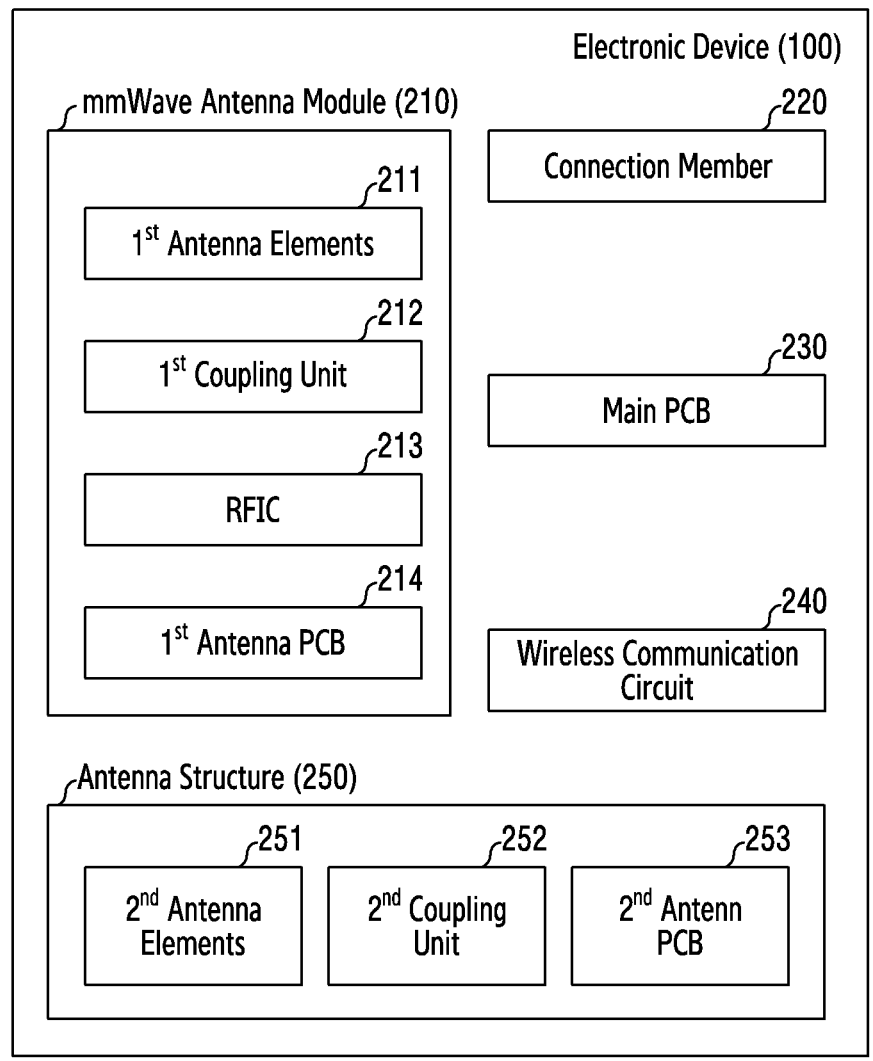
FIG. 2 illustrates a hardware configuration of the electronic device according to various embodiments of the disclosure.

FIG. 2 illustrates a hardware configuration of the electronic device 100 according to various embodiments.

Referring to FIG. 2, the electronic device 100 includes at least one mmWave antenna module 210, a connection member 220, a main PCB 230, a wireless communication circuit 240, or an antenna structure 250. In an example, the connection member 220 may include a flexible printed circuit board (FPCB), a PCB, or a coaxial cable.

According to an embodiment, the at least one mmWave antenna module 210 includes first antenna elements 211, a first coupling unit 212, an RFIC 213, or a first antenna PCB 214.

According to an embodiment, the electronic device 100 may further include components in addition to the at least one mmWave antenna module 210, the connection member 220, the main PCB 230, the wireless communication circuit 240, and/or the antenna structure 250. In an example, the electronic device 100 may further include a second PCB (or a slave PCB) (not illustrated).

According to an embodiment, the at least one mmWave antenna module 210 may be electrically connected to the connection member 220. In an example, the at least one mmWave antenna module 210 may be electrically connected to the connection member 220 via the first coupling unit 212.

According to an embodiment, the wireless communication circuit 240 is disposed on the main PCB 230. In an example, the wireless communication circuit 240 may be disposed on the main PCB 230 to be electrically connected to other electronic components (not illustrated) disposed on the main PCB 230. For example, the wireless communication circuit 240 may be electrically connected to a communication module (not illustrated) disposed on the main PCB 230.

According to an embodiment, the mmWave antenna module 210 may be electrically connected to the wireless communication circuit 240. In an example, the mmWave antenna module 210 may be electrically connected to the main PCB 230 to be electrically connected to the wireless communication circuit 240 disposed on the main PCB 230.

According to an embodiment, the wireless communication circuit 240 performs wireless communication by using the at least one mmWave antenna module 210 that is electrically connected thereto. In an example, the wireless communication circuitry 240 may transmit and/or receive signals by using the mmWave antenna module 210.

According to an embodiment, the antenna structure 250 may include second antenna elements 251, a second coupling unit 252, or a second antenna PCB 253. In an example, the second antenna elements 251, the second coupling unit 252, or the second antenna PCB 253 may be substantially the same in configuration as the first antenna elements 211, the first coupling unit 212, or the first antenna PCB 214, respectively.

According to an embodiment, the antenna structure 250 may be electrically connected to the mmWave antenna module 210 via the connection member 220. For example, one end of the connection member 220 may be connected to the first coupling unit 212, and the other end of the connection member 220 may be connected to the second coupling unit 252.

Figure 3A:
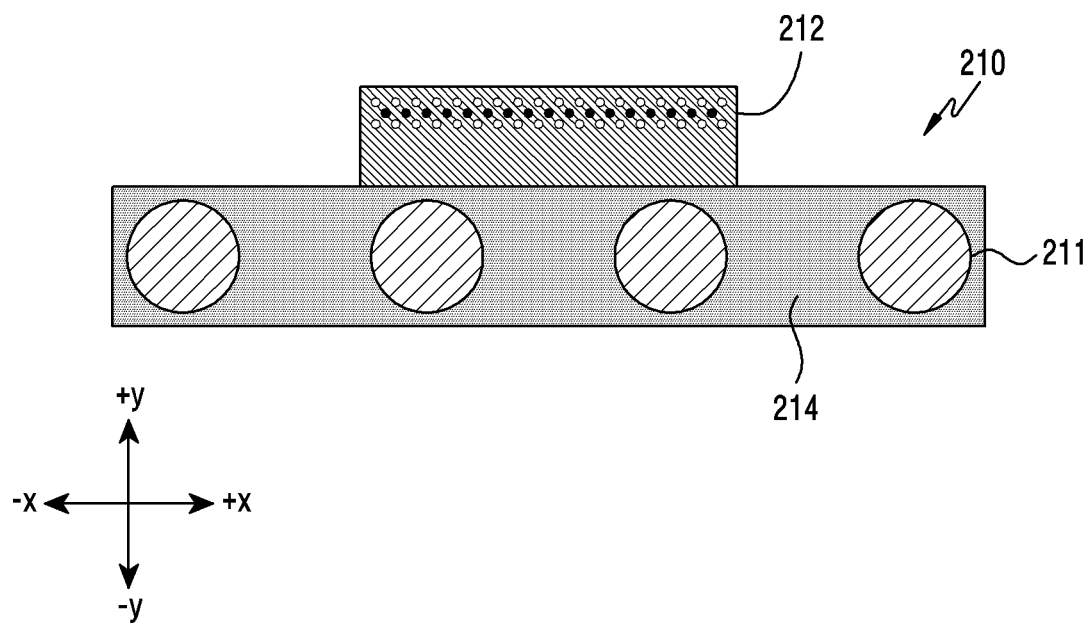
FIG. 3A illustrates a mmWave antenna module including a first coupling unit according to an embodiment.
Figure 3B:
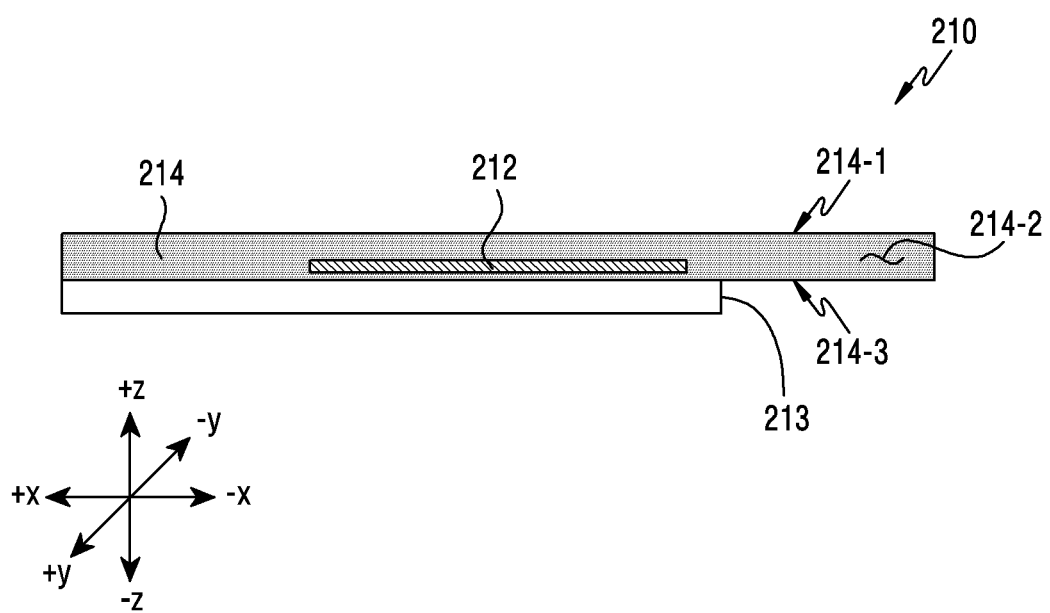
FIG. 3B illustrates a side surface of the mmWave antenna module of FIG. 3A according to an embodiment.
Figure 3C:
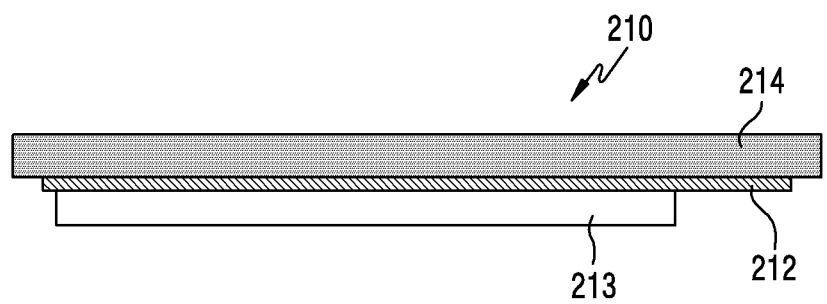
FIG. 3C illustrates a side surface of the mmWave antenna module of FIG. 3A according to another embodiment.

FIG. 3A illustrates a mmWave antenna module 210 including a first coupling unit 212 according to an embodiment. FIG. 3B illustrates a side surface of the mmWave antenna module 210 of FIG. 3A according to an embodiment. FIG. 3C illustrates a side surface of the antenna module 210 of FIG. 3A according to another embodiment.

Referring to FIGS. 3A, 3B, and 3C, at least one mmWave antenna module 210 may include first antenna elements 211, a first coupling unit 212, an RFIC 213, and/or a first antenna PCB 214.

According to an embodiment, the first antenna elements 211 included in the mmWave antenna module 210 may be disposed on the first antenna PCB 214. In an example, the first antenna elements 211 may be provided in a pattern on the first antenna PCB 214.

According to an embodiment, the first antenna elements 211 may be conductive patches. In an example, the first antenna elements 211 may operate as a plurality of conductive patch antennas which are disposed to be spaced apart from each other at a predetermined interval.

According to an embodiment, the first antenna elements 211 may be dipole antennas. In an example, the first antenna elements 211 may operate as a plurality of dipole antennas which are disposed to be spaced apart from each other at a predetermined interval.

According to an embodiment, the first antenna elements 211 may be disposed on the first surface 214-1 of the mmWave antenna module 210 oriented in the first direction (e.g., the +z-axis direction in FIG. 3B) or inside the first antenna PCB 214 to be adjacent to the first surface 214-1.

According to an embodiment, the first coupling unit 212 may be provided to protrude from a second surface 214-2 substantially perpendicular to the first surface 214-1 of the mmWave antenna module 210 in a second direction (e.g., the +y-axis direction in FIG. 3B). In an example, the first coupling unit 212 may be provided to extend at least partially in the second direction (e.g., the +y-axis direction of FIG. 3B) from the second surface 214-2 of the mmWave antenna module 210.

According to an embodiment, the RFIC 213 may be disposed on the third surface 214-3 of the mmWave antenna module 210 that is oriented in the third direction (e.g., the −z-axis direction in FIG. 3B) opposite to the first direction (e.g., +z-axis direction in FIG. 3B).

According to an embodiment, the first coupling unit 212 and the RFIC 213 may be provided on different layers that are alternately stacked. In an example, the layer on which the first coupling unit 212 is provided or disposed and the layer on which the RFIC 213 is disposed may be disposed to be spaced apart from each other along the z-axis of FIG. 3B.

Referring to FIG. 3C, the first coupling unit 212 according to an embodiment may be disposed between the RFIC 213 and the first antenna PCB 214. In an example, the first coupling unit 212 may be provided to be in contact with one surface of the RFIC 213 and one surface of the first antenna PCB 214.

Figure 3D:
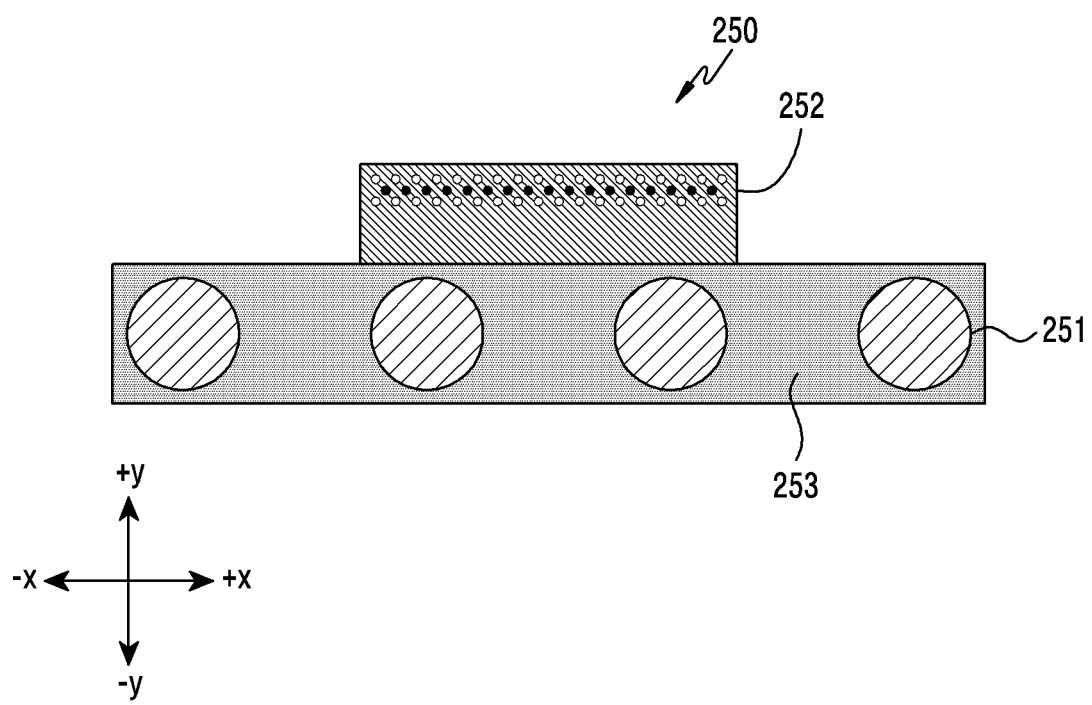
FIG. 3D illustrates an antenna structure according to an embodiment.
Figure 3E:
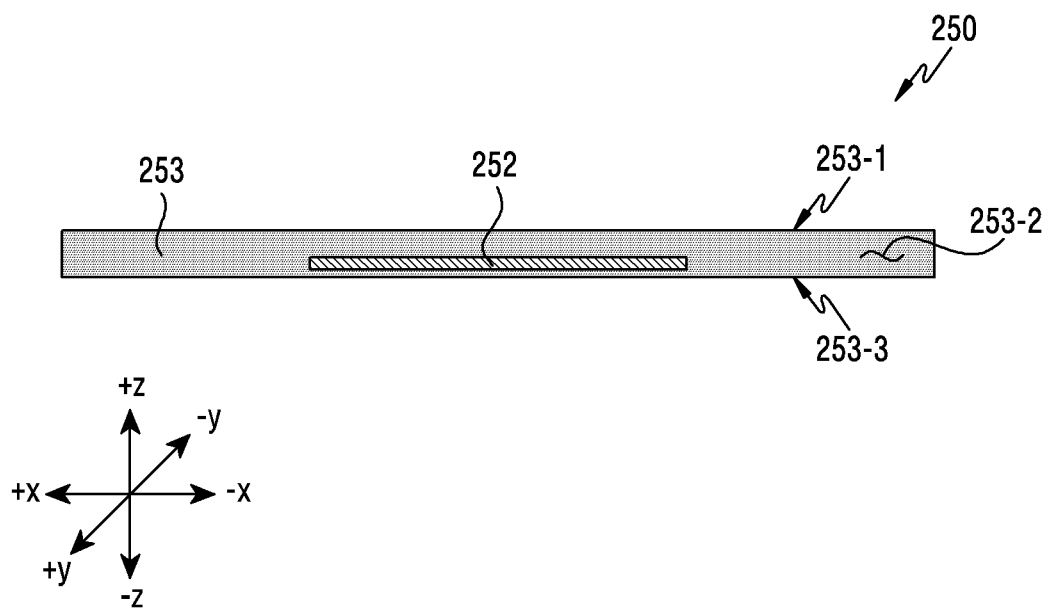
FIG. 3E illustrates a side surface of the mmWave antenna module of FIG. 3D according to an embodiment.

FIG. 3D illustrates an antenna structure 250 according to an embodiment. FIG. 3E illustrates a side surface of the antenna structure 250 according to an embodiment.

Referring to FIGS. 3D and 3E, the antenna structure 250 may include second antenna elements 251, a second coupling unit 252, and a second antenna PCB 253.

According to an embodiment, the second antenna elements 251 may be disposed on the first surface 253-1 of the second antenna PCB 253 or inside the second antenna PCB 253 to be adjacent to the first surface 253-1. In an example, the second antenna elements 251 may operate as patch antennas on the first surface 253-1.

According to an embodiment, the second coupling unit 252 may be provided to extend in the +y-direction from a point on the second surface 253-2 of the second antenna PCB 253.

According to an embodiment, the second coupling unit 252 may be provided to extend in the +y-direction while being disposed on the third surface 253-3 of the second antenna PCB 253, unlike that illustrated in FIG. 3E.

Figure 3F:
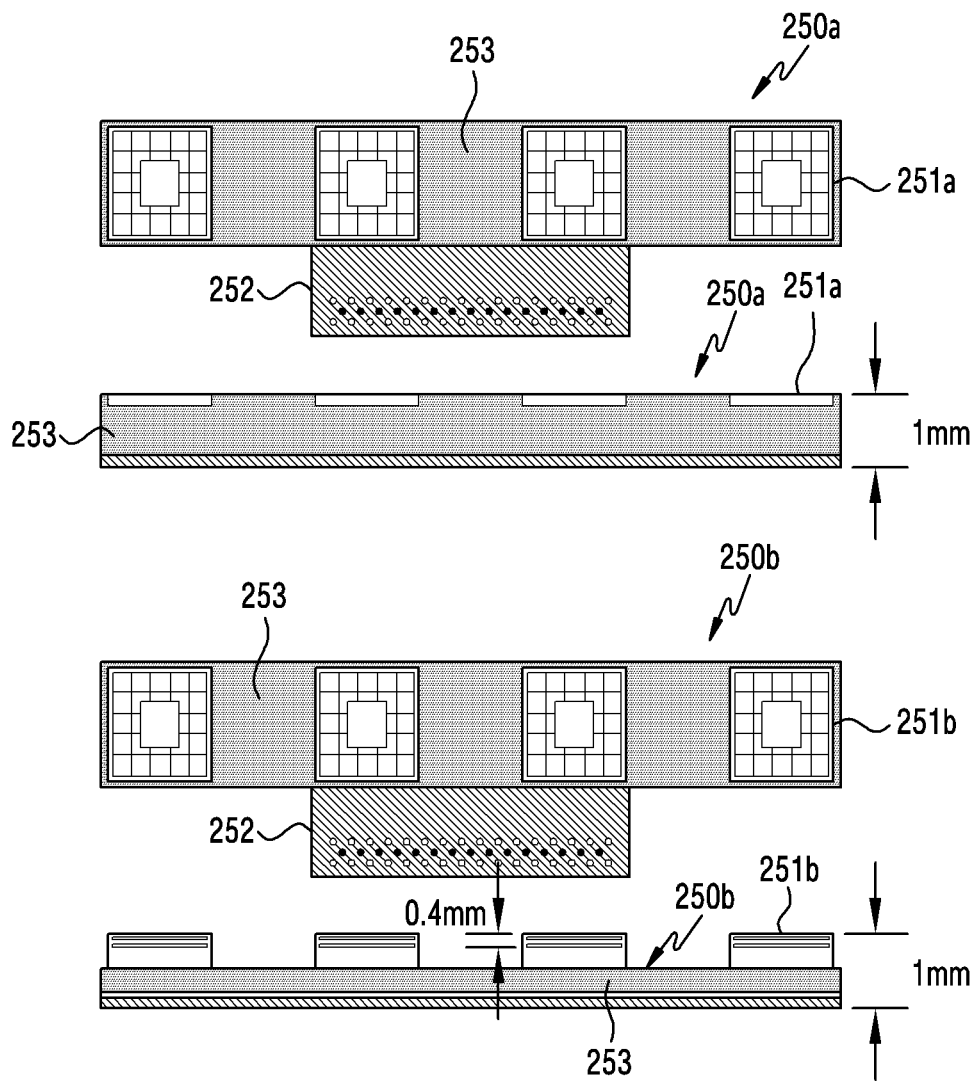
FIG. 3F illustrates mmWave antenna modules including a second coupling unit according to an embodiment.

FIG. 3F illustrates antenna structures 250a and 250b including a second coupling unit 252 according to an embodiment.

Referring to FIG. 3F, the second antenna elements 251a may be provided in various shapes in the antenna structure.

According to an embodiment, the second antenna elements 251a may be disposed to form the same plane as one surface of the second antenna PCB 253 not to have a step difference with the one surface of the first antenna structure 250a or may be provided inside the second antenna PCB 253 to be adjacent to the one surface. In an example, the second antenna elements 251a may be provided on one surface of the second antenna PCB 253 in the form of patches having no height difference. For example, the first antenna structure 250a may have a height of about 1 mm including the second antenna elements 251a.

According to an embodiment, the second antenna elements 251b may be provided on one surface of the second antenna structure 250b to have a predetermined height. In an example, the second antenna elements 251b may be provided on one surface of the second antenna structure 250b in the form of chip antennas having a high dielectric constant.

According to an embodiment, the second antenna structure 250b on which the second antenna elements 251b having a predetermined height are disposed may have substantially the same height as the first antenna structure 250a in which the second antenna elements 251a are disposed inside the second antenna PCB 253. In another example, the second antenna elements 251b may be provided in the form of chip antennas having a high dielectric constant and disposed on the second antenna structure 250b.

Figure 3G:
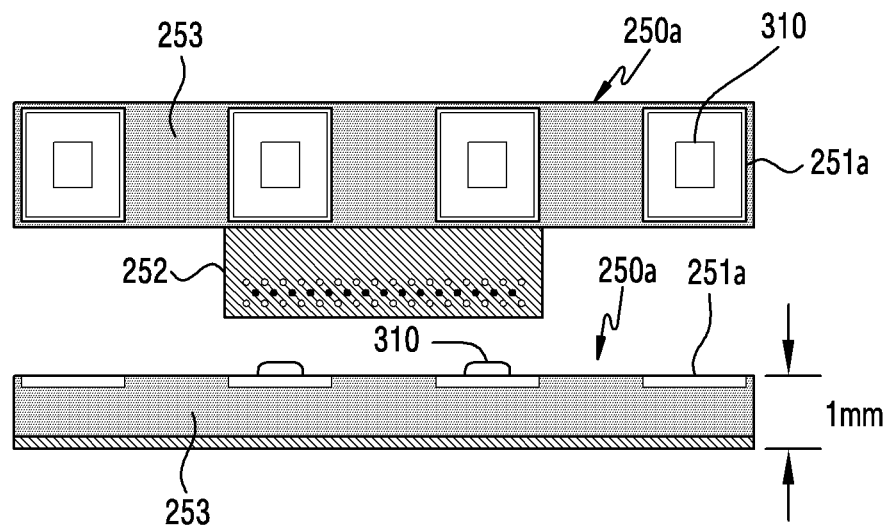
FIG. 3G illustrates mmWave antenna modules including a second coupling unit according to an embodiment.
Figure 3G:
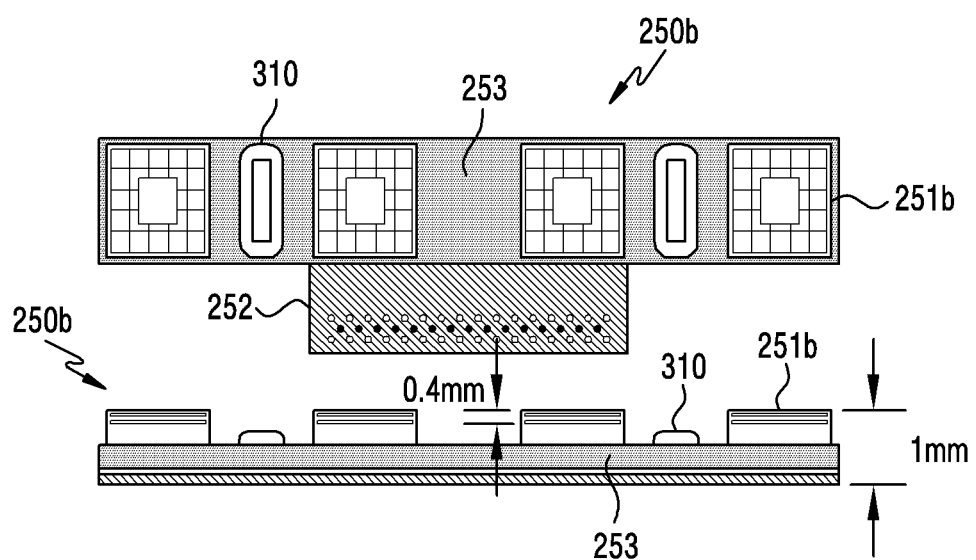

FIG. 3G illustrates antenna structures 250a and 250b including a key structure 310 and a first coupling unit 212 according to an embodiment.

Referring to FIG. 3G, key structures 310 may be provided on one surface of the antenna structure 250a or 250b. For example, each key structure 310 may be a portion of a dome key.

According to an embodiment, the key structures 310 may be disposed on the plurality of antenna elements 251a or 251b. In an example, the key structures 310 may be disposed on at least two of the first antenna elements 251a.

According to an embodiment, the key structures 310 may be disposed between the plurality of antenna elements 251a or 251b. In an example, the key structures 310 may be disposed on the second antenna structure 250b between the second antenna elements 251b.

Figure 3H:
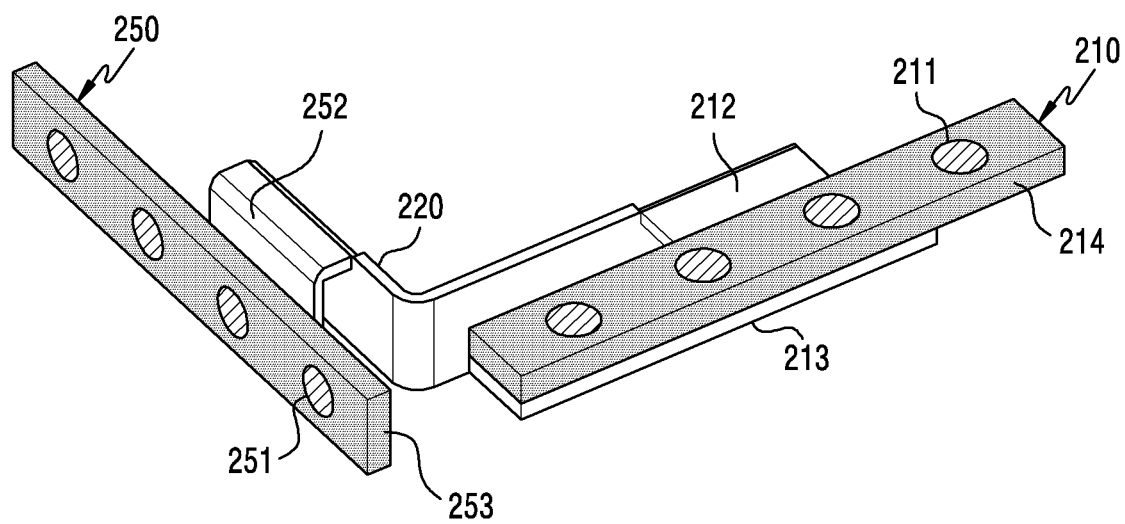
FIG. 3H illustrates a mmWave antenna module and an antenna structure coupled with a connection member according to an embodiment.

FIG. 3H illustrates a mmWave antenna module 210 and an antenna structure 250 coupled with a connection member 220 according to an embodiment.

Referring to FIG. 3H, the mmWave antenna module 210 and the antenna structure 250 may be connected to each other by being coupled with the connection member 220.

According to an embodiment, the mmWave antenna module 210 including the first antenna elements 211 and the RFIC 213 may be connected to one end of the connection member 220 and connected to the other end of the connection member 220, and may be electrically connected to the antenna structure 250 including the second antenna elements 251.

According to an embodiment, the connection member 220 may connect the antenna structures 250 capable of forming beam patterns in different directions by being provided with a curved in at least a portion thereof. In an example, the shape of the connection member 220 is not limited to the shape illustrated in FIG. 3H, and may include various shapes capable of connecting the mmWave antenna module 210 and the antenna structure 250.

Figure 4A:
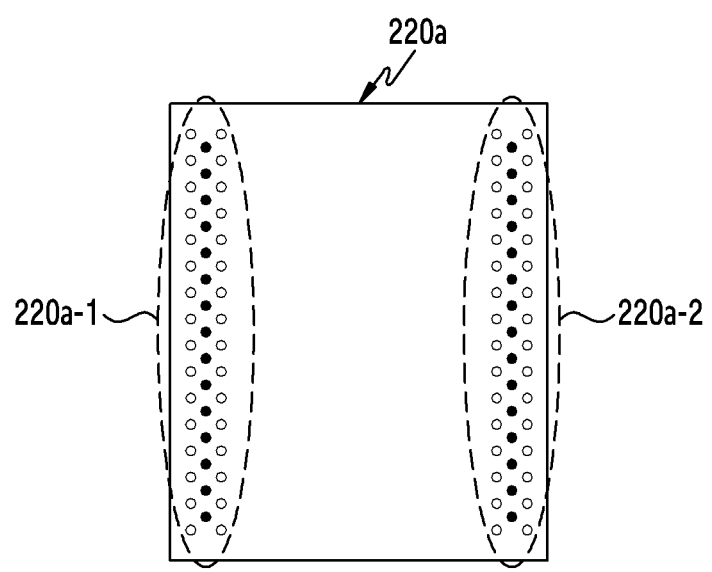
FIG. 4A illustrates a connection member according to an embodiment.
Figure 4B:
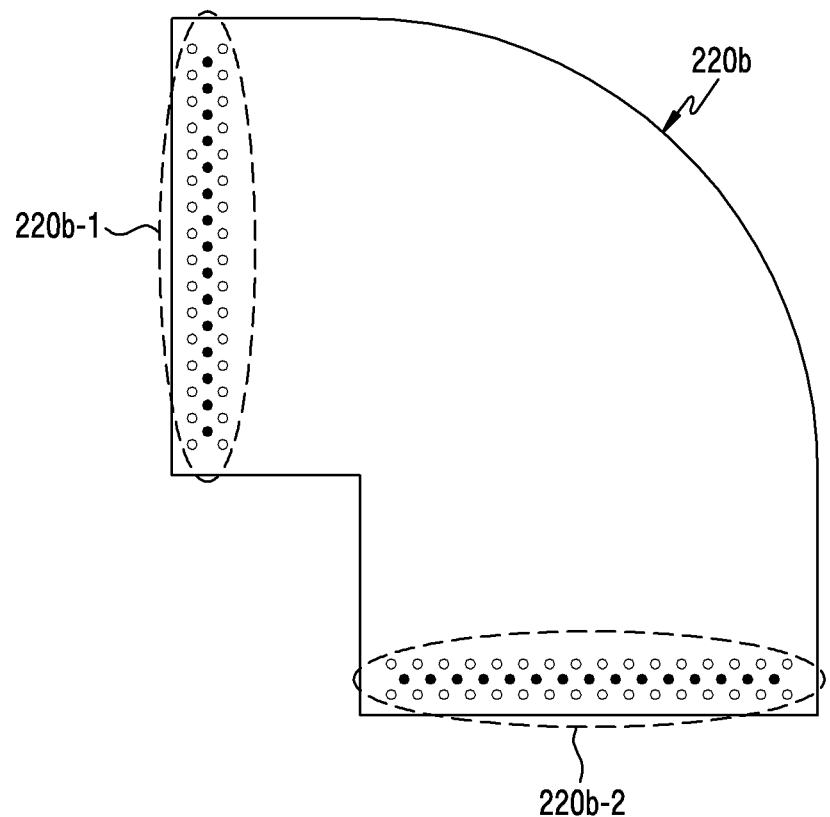
FIG. 4B illustrates a connection member according to an embodiment.
Figure 4C:
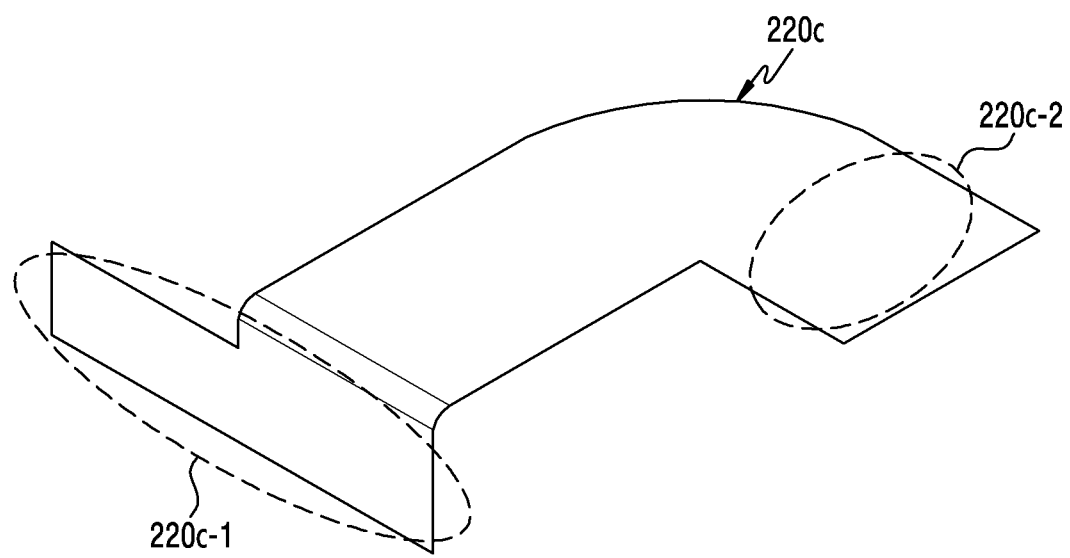
FIG. 4C illustrates a connection member according to an embodiment.

FIG. 4A illustrates a connection member 220a according to an embodiment. FIG. 4B illustrates a connection member 220b according to an embodiment. FIG. 4C illustrates a connection member 220c according to an embodiment.

Referring to FIGS. 4A, 4B, and 4C, the connection members 220a, 220b, and 220c may have various shapes.

According to an embodiment, the connection member 220a may have a rectangular shape, wherein two edges, which are parallel to each other, may each include a portion 220a-1 or 220a-2 to be coupled to at least one antenna module (e.g., the mmWave antenna module 210 in FIG. 3A).

According to an embodiment, the connection member 220b may have a sector shape in which at least a portion is curved, wherein, for example, two edges, which are perpendicular to each other and are oriented in different directions, may each include a portion 220b-1 or 220b-2 coupled to at least one antenna structure (e.g., the mmWave antenna module 210 in FIG. 3A).

According to an embodiment, the connection member 220c may have a shape including, for example, two surfaces perpendicular to each other and oriented in different directions, wherein, for example, two different edges, which are located at twisted positions, may each have a portion 220c-1 or 220c-2 coupled to at least one antenna module (e.g., the mmWave antenna module 210 in FIG. 3A).

Figure 5A:
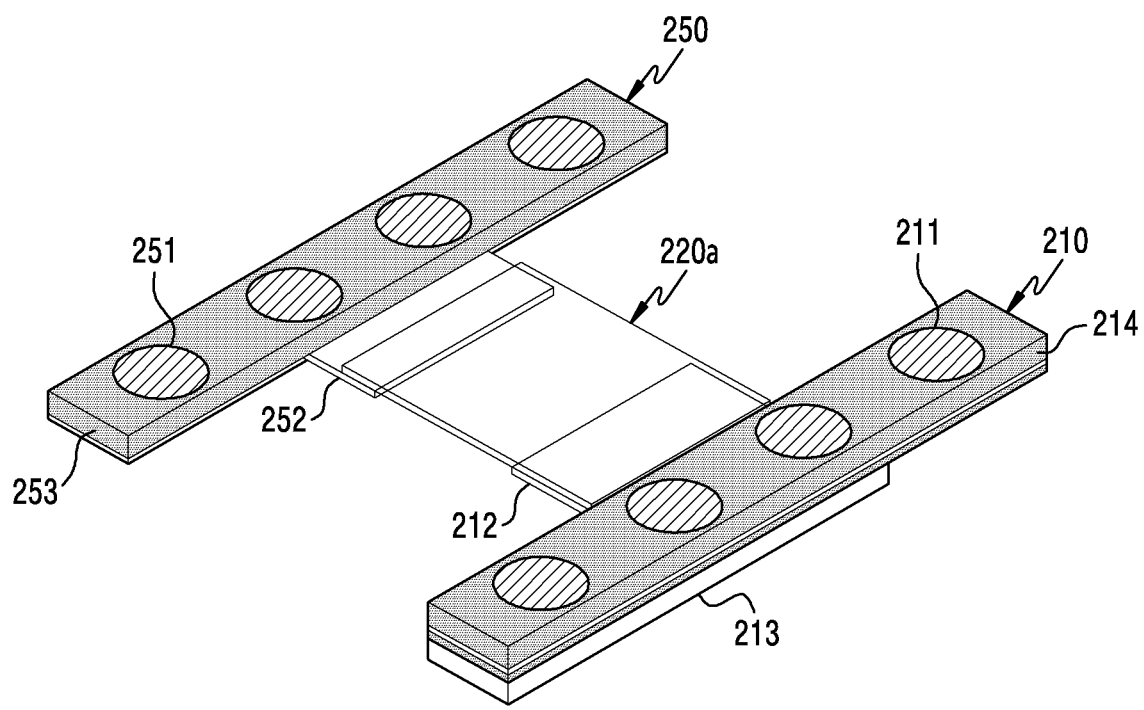
FIG. 5A illustrates a mmWave antenna module and an antenna structure coupled with a connection member according to an embodiment.
Figure 5B:
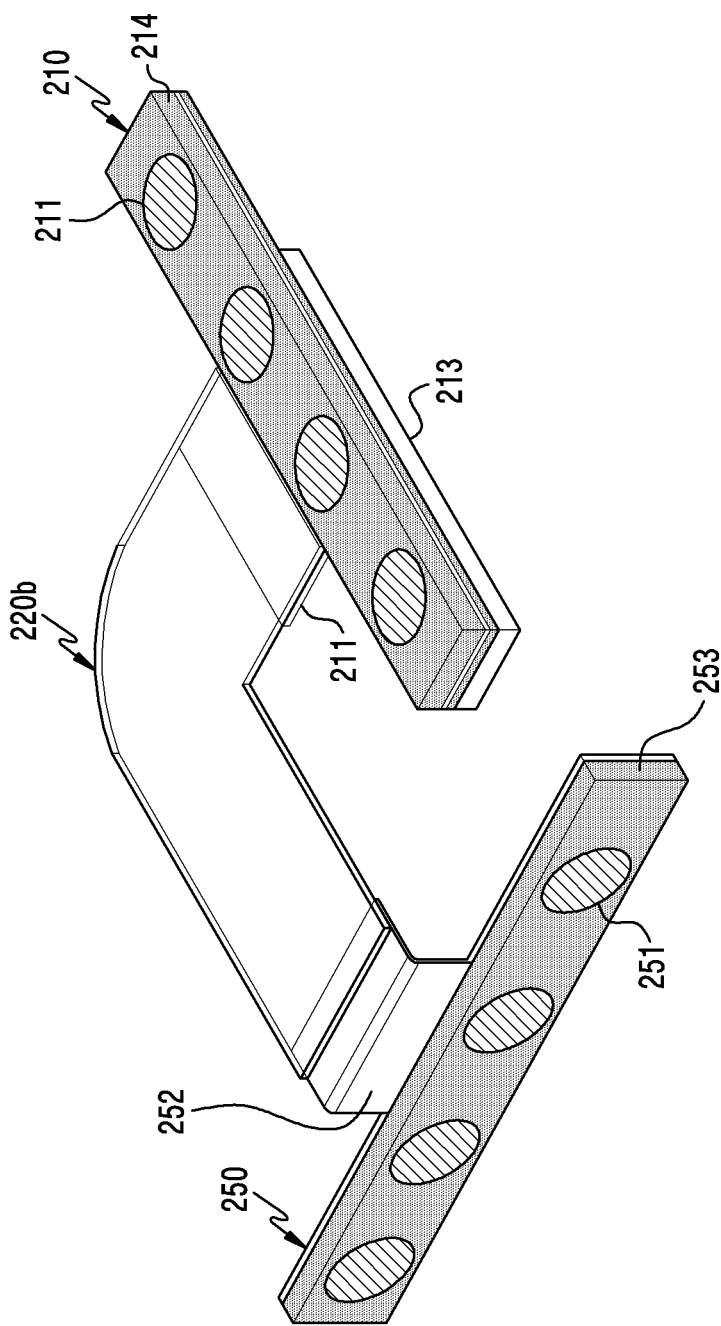
FIG. 5B illustrates a mmWave antenna module coupled with a connection member according to an embodiment.
Figure 5C:
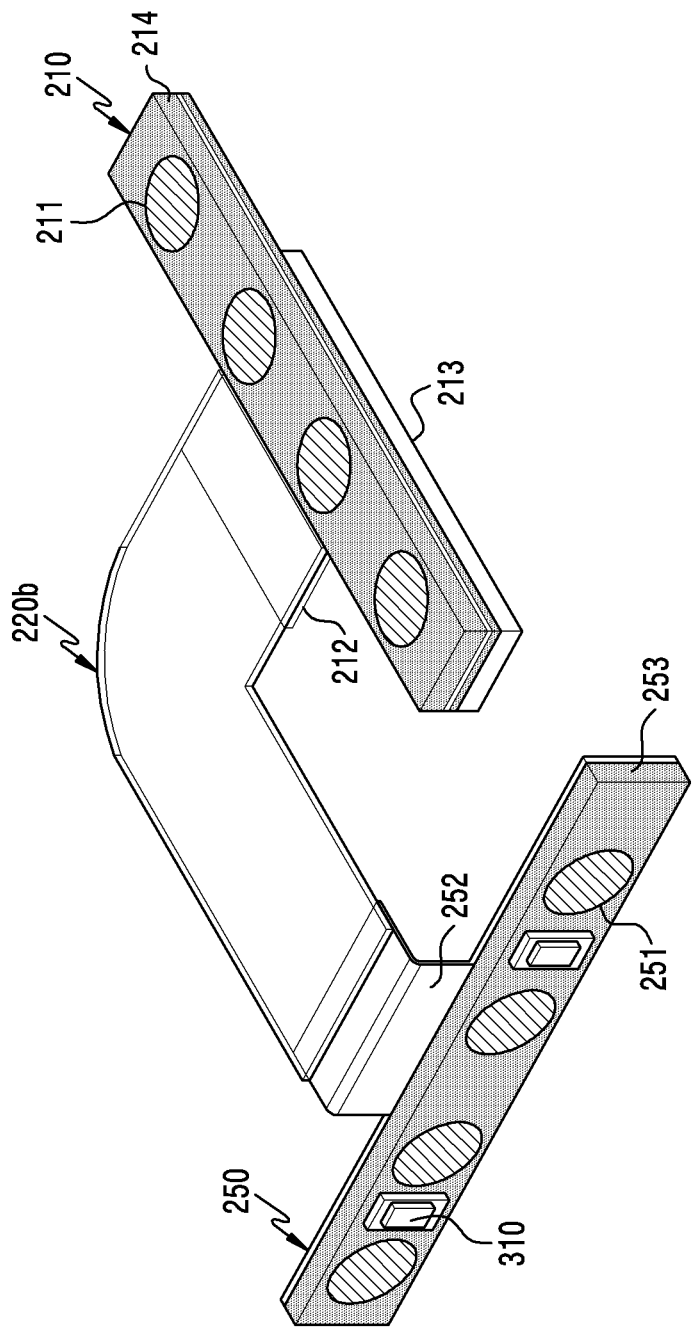
FIG. 5C illustrates a mmWave antenna module coupled with a connection member according to an embodiment.
Figure 5D:
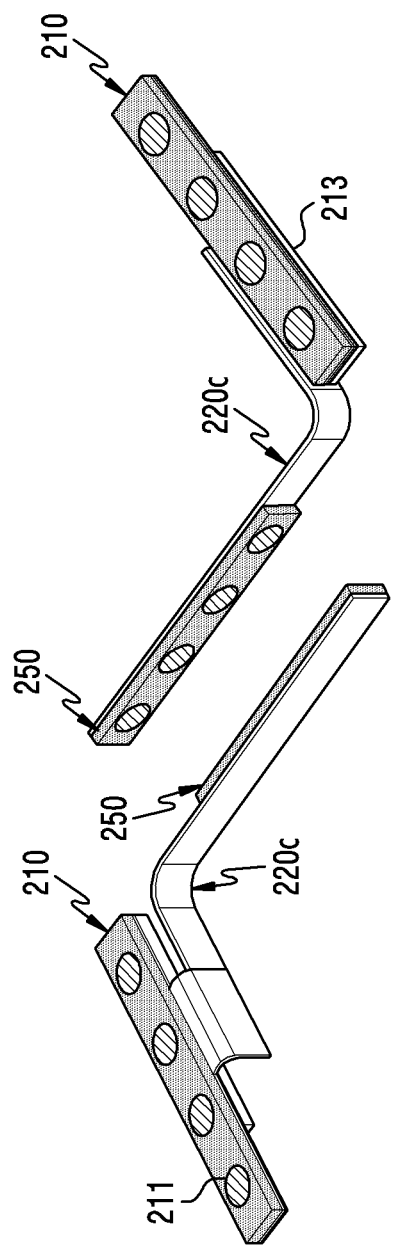
FIG. 5D illustrates a mmWave antenna module coupled with a connection member according to an embodiment.

FIG. 5A illustrates a mmWave antenna module 210 and an antenna structure 250 coupled to a connection member 220a according to an embodiment. FIG. 5B illustrates a mmWave antenna module 210 and an antenna structure 250 coupled to a connection member 220b according to an embodiment. FIG. 5C illustrates a mmWave antenna module 210 and an antenna structure 250 coupled to a connection member 220b according to an embodiment. FIG. 5D illustrates a mmWave antenna module 210 and an antenna structure 250 coupled to a connection member 220c according to an embodiment.

Referring to FIGS. 5A, 5B, 5C, and 5D, the mmWave antenna module 210 and the antenna structure 250 may be connected to each other via various types of connection members 220a, 220b, or 220c.

According to an embodiment, the mmWave antenna module 210 may be coupled to the rectangular connection member 220a via the first coupling unit 212, and the antenna structure 250 may be coupled to the connection member 220a via the second coupling unit 252 so that the mmWave antenna module 210 and the antenna structure 250 can be connected to each other.

According to an embodiment, the mmWave antenna module 210 may be coupled to the sector-shaped connection member 220b via the first coupling unit 212, and the antenna structure 250 may be coupled to the connection member 220b via the second coupling unit 252 so that two mmWave antenna modules 210 can be connected to each other. In an embodiment, the first coupling unit 212 of the mmWave antenna module 210 may be formed of a flexible material and at least partially bent.

According to an embodiment, the mmWave antenna module 210 and the antenna structure 250 may be connected to each other via the sector-shaped connection member 220b and the first coupling unit 212, respectively, and the key structures 310 may be disposed on the antenna structure 250.

According to an embodiment, the mmWave antenna module 210 may be connected, via the first coupling unit 212, to the first surface of the connection member 220c having a shape including two surfaces which are substantially perpendicular to each other, and the antenna structure 250 may be connected, via the second coupling unit 252, to a second surface which is perpendicular to the first surface of the connection member 220c.

Figure 6A:
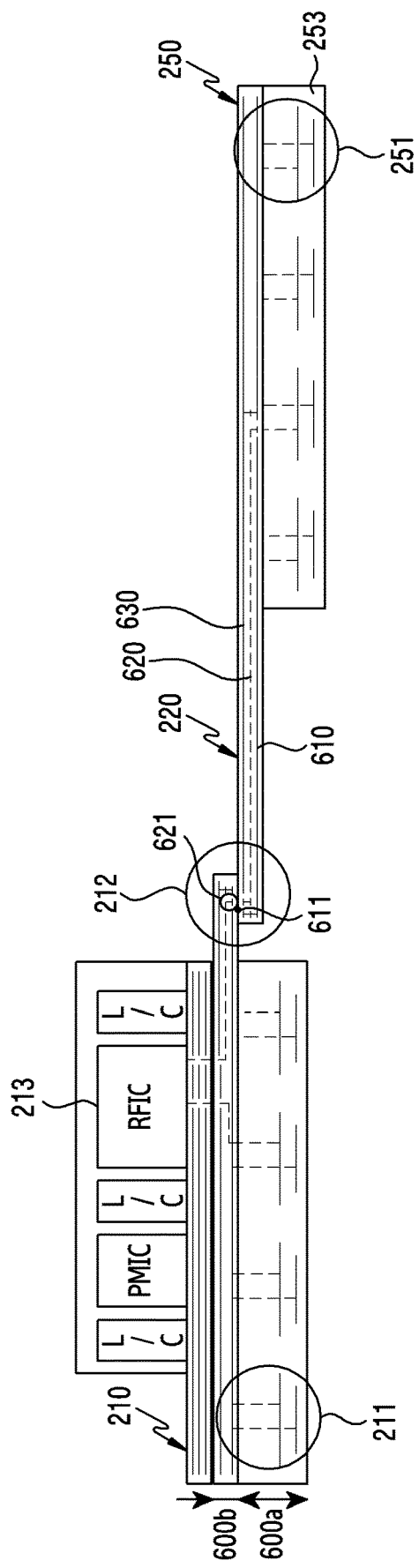
FIG. 6A is a side view illustrating a mmWave antenna module coupled with a connection member according to an embodiment.

FIG. 6A is a side view illustrating a mmWave antenna module 210 including a connection member 220 according to an embodiment.

Referring to FIG. 6A, the mmWave antenna module 210 may include different regions 600a or 600b that are alternately stacked.

According to an embodiment, first antenna elements 211 may be disposed in the first region 600a of the mmWave antenna module 210. In an example, the first region 600a of the mmWave antenna module 210 in which the first antenna elements 211 are disposed may be configured by alternately stacking a conductive material and a non-conductive material.

According to an embodiment, the first coupling unit 212 may be provided in a second region 600b different from the first region 600a in which the first antenna elements 211 are disposed. In an example, the first region 600a in which the first antenna elements 211 are disposed and the second region 600b in which the first coupling unit 212 is disposed may be spaced apart from each other.

According to an embodiment, the second coupling unit 252 of the antenna structure 250 may be provided to extend from one surface of a second antenna PCB 253 to be long enough to be electrically connected to the first coupling unit 212 of the mmWave antenna module 210. In this case, the connection member 220 may be omitted. As another example, the second coupling unit 252 may be omitted, and the connection member 220 may be directly electrically connected to the second antenna PCB 253 of the antenna structure 250.

According to an embodiment, the first electrical path 610 may be electrically connected to the first antenna elements 211 or the RFIC 213. In an example, the first electrical path 610 may be an electrical path connected to a ground region.

According to an embodiment, the first electrical path 610 may electrically connect the ground of the first antenna PCB 214 included in the mmWave antenna module 210 to the second antenna elements 251 included in the antenna structure 250. For example, the first electrical path 610 may extend to the first antenna PCB 214, the first coupling unit 212, the first region 600a, the second region 600b, the second coupling unit 252, and the second antenna PCB 253 to interconnect the ground of the first antenna PCB 214 and the ground of the second antenna PCB 253. In an example, a solder ball may be provided at a first point 611.

According to an embodiment, the second electrical path 620 may be electrically connected to the first antenna elements 211 or the RFIC 213.

According to an embodiment, a second electrical path 620 may connect the RFIC 213 disposed on the first antenna PCB 214 included in the mmWave antenna module 210 to the second antenna elements 251 included in the antenna structure 250. For example, the second electrical path 620 may extend to the first antenna PCB 214, the first coupling unit 212, the connection member 220, the second coupling unit 252, and the second antenna PCB 253 to electrically connect the RFIC 213 to the second antenna elements 251 disposed on the second antenna PCB 253. In an example, the second electrical path 620 may be an RF signal path.

According to an embodiment, the third electrical path 630 may be electrically connected to the first antenna elements 211 or the RFIC 213. In an example, the third electrical path 630 may be an electrical path connected to a ground region. The third electrical path 630 may electrically connect the ground of the first antenna PCB 214 included in the mmWave antenna module 210 to the second antenna elements 251 included in the antenna structure 250. For example, the third electrical path 630 may extend to the first antenna PCB 214, the first coupling unit 212, the connection member 220, the second coupling unit 252, and the second antenna PCB 253 to interconnect the ground of the first antenna PCB 214 and the ground of the second antenna PCB 253.

According to an embodiment, the first electrical path 610, the second electrical path 620, and the third electrical path 630 may provide a coplanar waveguide (CPW).

Figure 6B:
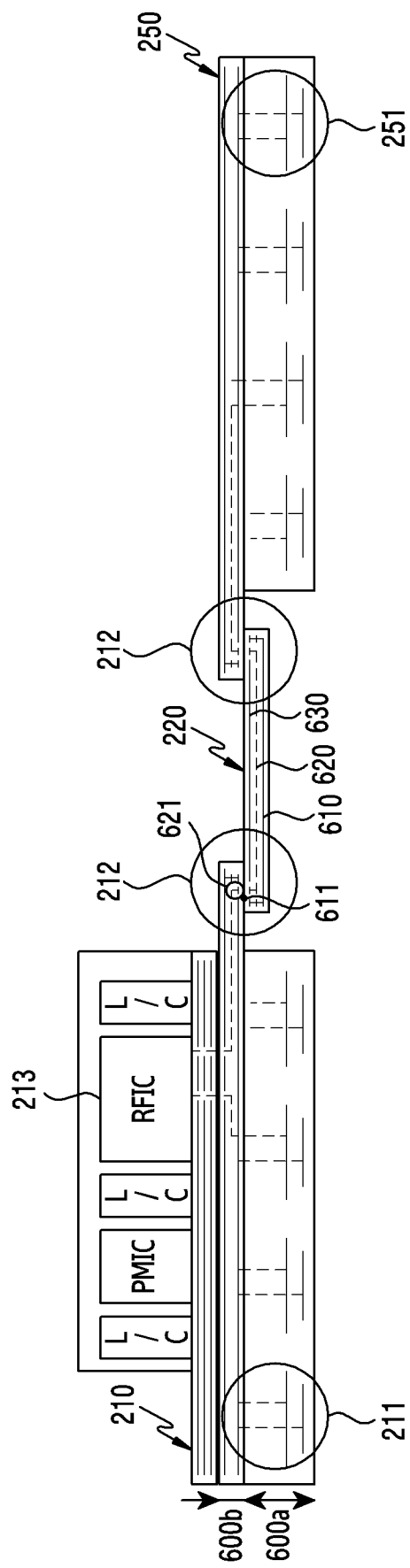
FIG. 6B is a side view illustrating a mmWave antenna module coupled with a connection member according to an embodiment.

FIG. 6B is a side view illustrating a mmWave antenna module 210 coupled to a connection member 220 according to an embodiment.

Referring to FIG. 6B, the mmWave antenna module 210 may be coupled to the connection member 220 via the first coupling unit 212, and the antenna structure 250 may be coupled to the connection member 220 via the second coupling unit 252.

According to an embodiment, the mmWave antenna module 210 which is provided with the RFIC 213 may be coupled to the connection member 220 via the first coupling unit 212 extending at least partially from the second region 600b, and the connection member 220 may be coupled to the antenna structure 250 via the second coupling unit 252 of the antenna structure 250. In an example, the description of the first point 611 and the conductive via 621 may be understood to be the same as that described with reference to FIG. 6A.

Figure 6C:
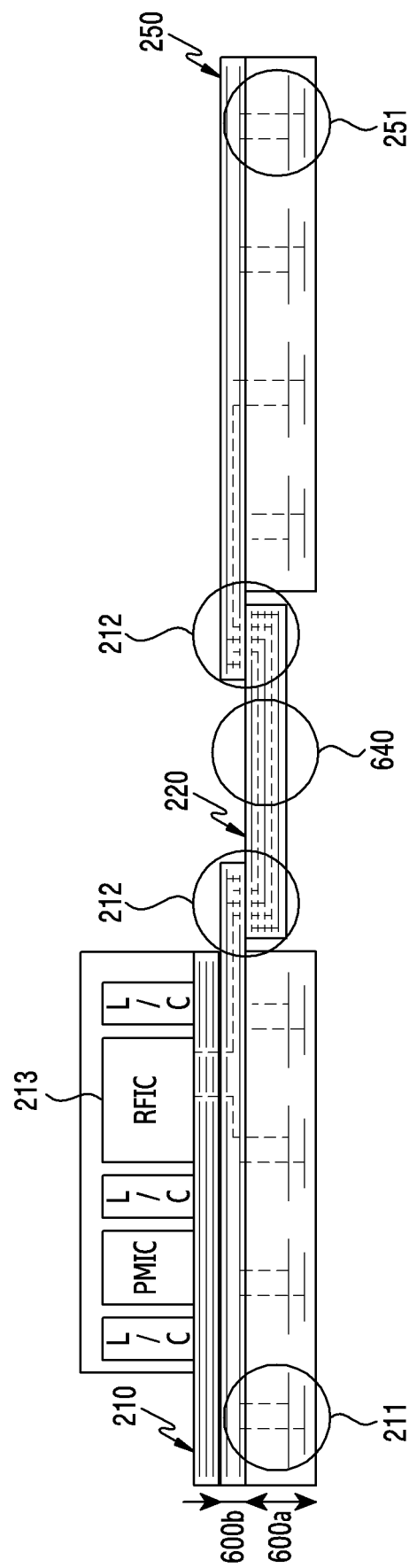
FIG. 6C is a side view illustrating a mmWave antenna module coupled with a connection member according to an embodiment.

FIG. 6C is a side view illustrating a mmWave antenna module 210 coupled to a connection member 220 according to an embodiment.

Referring to FIG. 6C, a plurality of electrical paths may be provided in each of the first coupling unit 212 included in the mmWave antenna module 210 and the second coupling unit 252 included in the antenna structure 250.

According to an embodiment, at least five electrical paths may be provided in the first coupling unit 212 and the second coupling unit 252. In an example, each of the first coupling unit 212 and the second coupling unit 252 may include at least three electrical paths and at least two RF signal paths connected to a ground region.

Figure 7A:
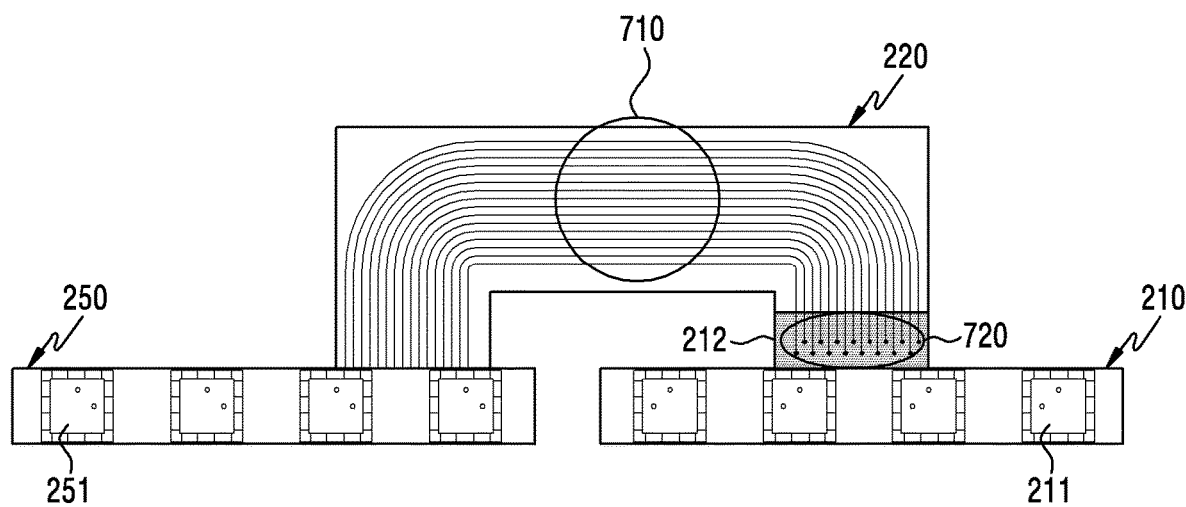
FIG. 7A illustrates a mmWave antenna module and an antenna structure connected to each other via a plurality of wires according to an embodiment.
Figure 7B:
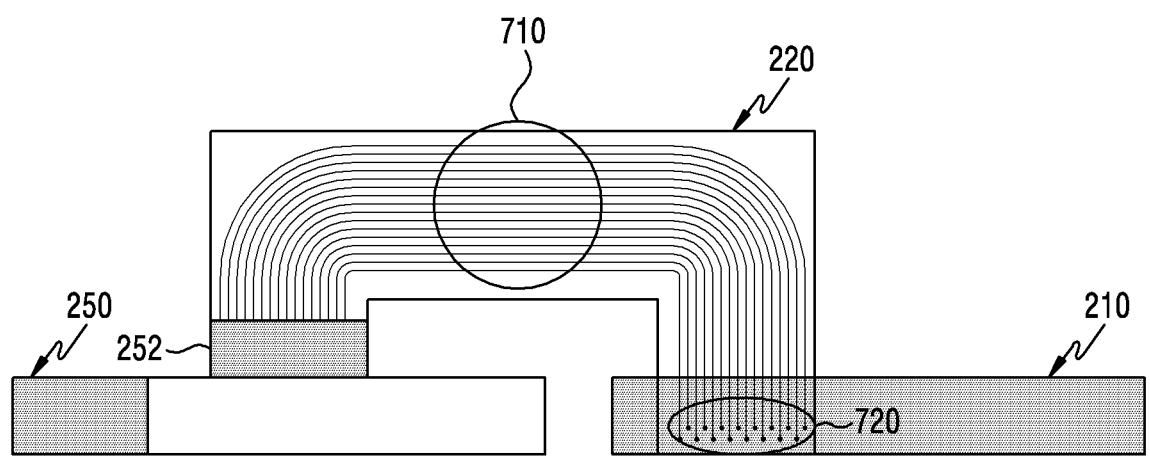
FIG. 7B illustrates a mmWave antenna module and an antenna structure connected to each other via a plurality of wires according to an embodiment.

FIG. 7A illustrates a mmWave antenna module 210 and an antenna structure 250 connected to each other via a plurality of wires 710 according to an embodiment. FIG. 7B illustrates a mmWave antenna module 210 and an antenna structure 250 connected to each other via a plurality of wires 710 according to an embodiment.

Referring to FIGS. 7A and 7B, the mmWave antenna module 210 and the antenna structure 250 may be electrically connected to each other by the plurality of wires 710 provided on the connection member 220. In an example, the plurality of wires 710 may include an electrical path (e.g., the first electrical path 610 or the third electrical path 630 in FIG. 6A) or an RF signal path (e.g., the second electrical path 620 in FIG. 6A) connected to a ground region.

According to an embodiment, the mmWave antenna module 210 including the first antenna elements 211 may be coupled to the connection member 220 via the first coupling unit 212.

According to an embodiment, the plurality of wires 710 provided on the connection member 220 may be electrically connected to the first coupling unit 212 via connection points 720 (e.g., the first point 611 in FIG. 6A) of the first coupling unit 212. In an example, solder balls may be provided at the connection points 720 provided in the first coupling unit 212.

According to an embodiment, the plurality of wires 710 provided on the connection member 220 may be directly connected to at least one mmWave antenna module 210 without passing through the first coupling unit 212. In an example, the plurality of wires 710 provided on the connection member 220 may be electrically connected to the mmWave antenna module 210 via the connection points 720 provided on one surface of the at least one mmWave antenna module 210.

Figure 8A:
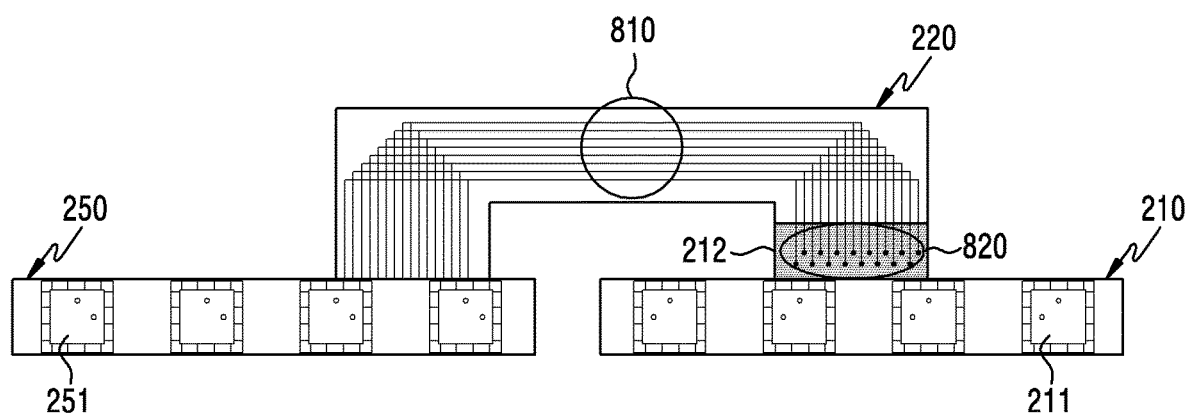
FIG. 8A illustrates a mmWave antenna module and an antenna structure connected to each other via a plurality of wires according to an embodiment.
Figure 8B:
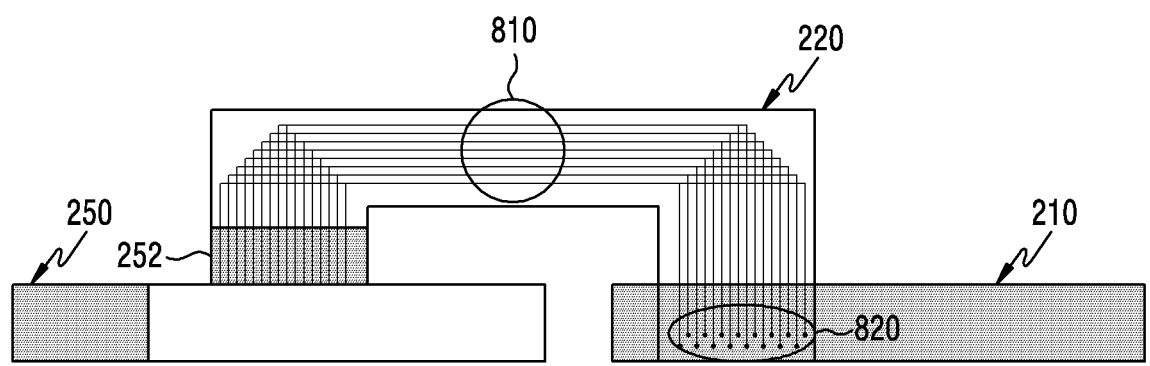
FIG. 8B illustrates a mmWave antenna module and an antenna structure connected to each other via a plurality of wires according to an embodiment.
Figure 8C:
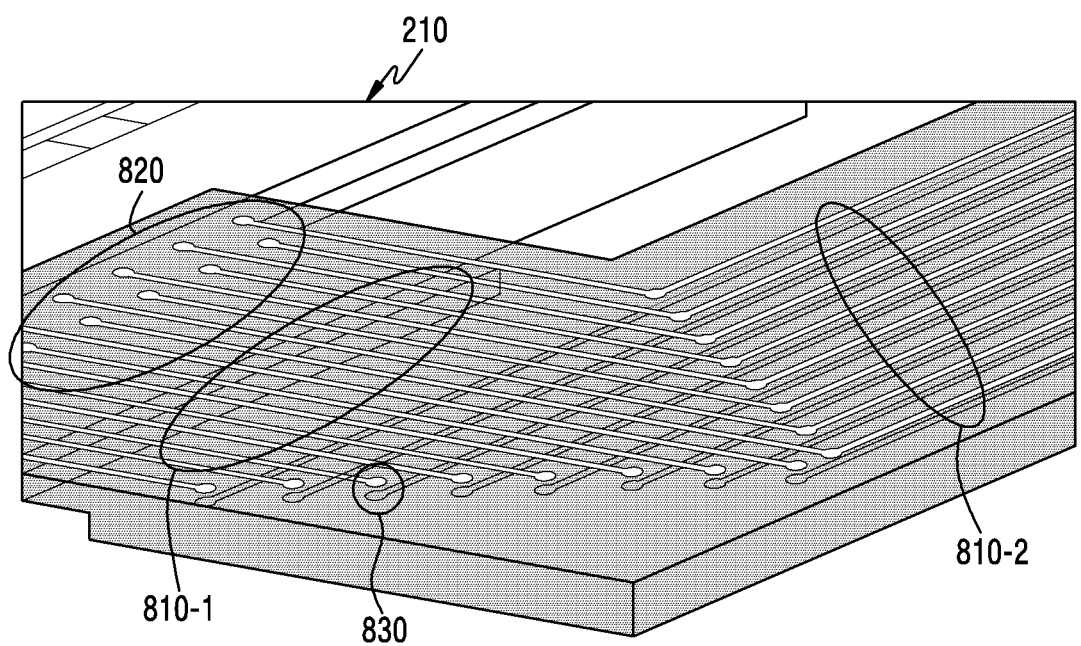
FIG. 8C illustrates a mmWave antenna module and an antenna structure connected to each other via a plurality of wires according to an embodiment.

FIG. 8A illustrates a mmWave antenna module 210 and an antenna structure 250 connected to each other via a plurality of wires 810 according to an embodiment. FIG. 8B illustrates a mmWave antenna module 210 and an antenna structure 250 connected to each other via a plurality of wires 810 according to an embodiment. FIG. 8C illustrates a mmWave antenna module 210 and an antenna structure 250 connected to each other via a plurality of wires 810-1 and 810-2 according to an embodiment.

Referring to FIGS. 8A, 8B, and 8C, the mmWave antenna module 210 and the antenna structure 250 are electrically connected to the connection member 220 via a plurality of wires 810 provided in a plurality of layers. In an example, the plurality of wires 810 may include an electrical path (e.g., the first electrical path 610 or the third electrical path 630 in FIG. 6A) or an RF signal path (e.g., the second electrical path 620 in FIG. 6A) connected to a ground region.

According to an embodiment, the mmWave antenna module 210 including the first antenna elements 211 may be coupled to the connection member 220 via the first coupling unit 212.

According to an embodiment, the plurality of wires 810 provided in the connection member 220 may be electrically connected to the first coupling unit 212 via a plurality of connection points 820 provided in the first coupling unit 212. In an example, solder balls may be provided at the plurality of connection points 820 provided in the first coupling unit 212.

According to an embodiment, the plurality of wires 810 provided on the connection member 220 may be electrically connected to the plurality of connection points 820 provided on one surface of the mmWave antenna module 210 without passing through the first coupling unit 212. In an example, solder balls may be provided at the plurality of connection points 820 provided on the one surface of the mmWave antenna module 210.

According to an embodiment, a plurality of first wires 810-1 extending from the plurality of connection points 820 provided in the first coupling unit 212 of the mmWave antenna module 210 may be electrically connected to a plurality of second wires 810-2 via the plurality of conductive vias 830. In an example, at least some of the plurality of first wires 810-1 and the plurality of second wires 810-2 may be disposed on different layers. For example, the plurality of first wires 810-1 may be disposed on the same layer as the plurality of connection points 820 provided in the first coupling unit 212, and the plurality of second wires 810-2 may be disposed on a different layer from the plurality of connection points 820.

Figure 9:
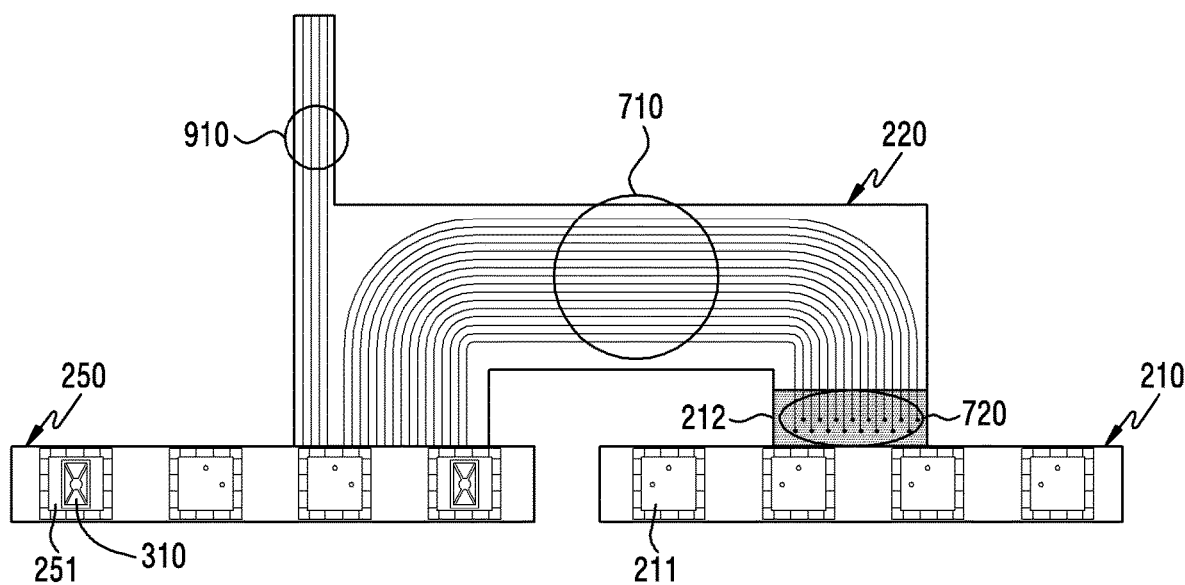
FIG. 9 illustrates a mmWave antenna module, an antenna structure, and a key signal path connected to each other via a plurality of wires according to an embodiment.

FIG. 9 illustrates a mmWave antenna module 210, an antenna structure 250, and a key signal path 910 connected to each other via a plurality of wires 710 according to an embodiment.

Referring to FIG. 9, the mmWave antenna module 210 electrically connected via the connection member 220 may be electrically connected to the plurality of signal wires 710 and the key signal path 910 provided in the connection member 220.

According to an embodiment, the antenna structure 250 including the second antenna elements 251 and the key structures 310 disposed on the second antenna elements 251 may be electrically connected to the plurality of wires 710 provided in the connection member 220. In an example, the plurality of wires 710 provided in the connection member 220 and electrically connected to the antenna structure 250 may include a ground path or an RF signal path connected to a ground region.

According to an embodiment, the antenna structure 250 including the second antenna elements 251 and the key structures 310 disposed on the second antenna elements 251 may be electrically connected to the key signal path 910. In an example, the key signal path 910 may be a path for transmitting a signal to the key structures 310.

According to an embodiment, the plurality of wires 710 and the key signal path 910 provided in the connection member 220 may be provided on the same layer. In an example, the plurality of wires 710 and the key signal paths 910 provided in the connection member 220 may be provided on the same layer as the plurality of connection points 720 provided in the first coupling unit 212.

Figure 10A:
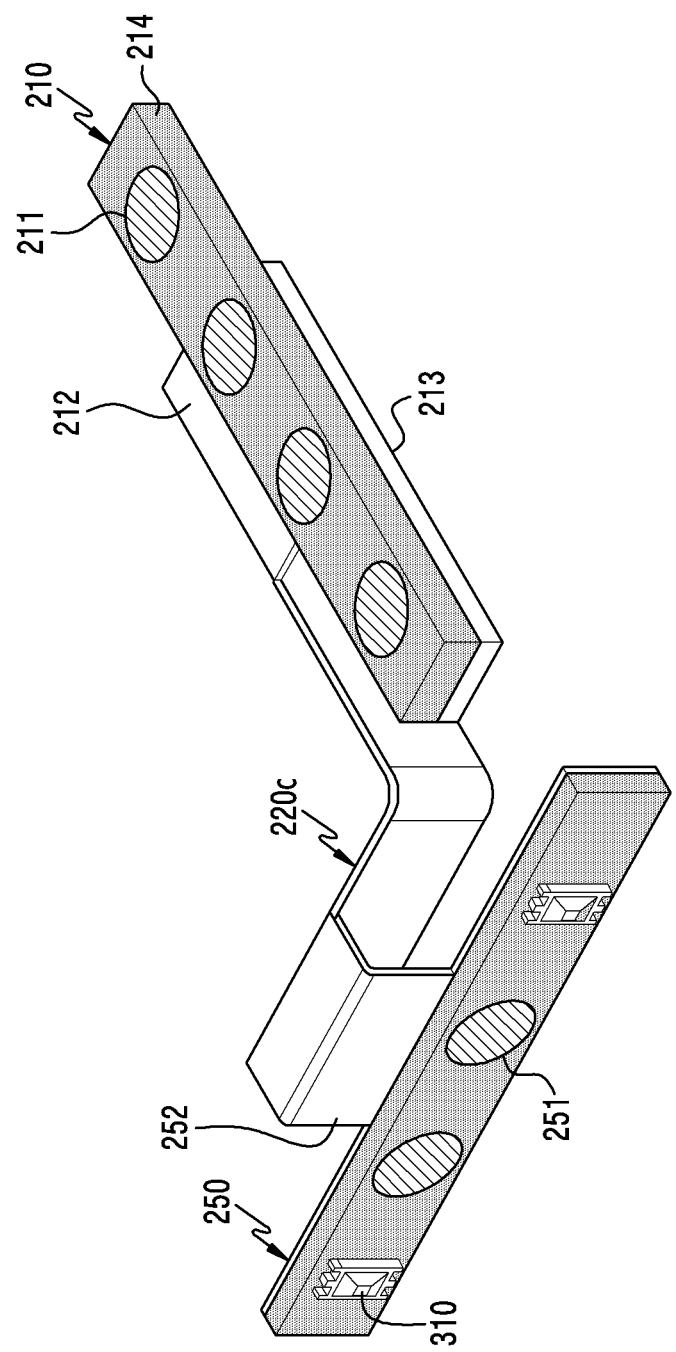
FIG. 10A illustrates an antenna structure including a key structure coupled with a connection member according to an embodiment.
Figure 10B:
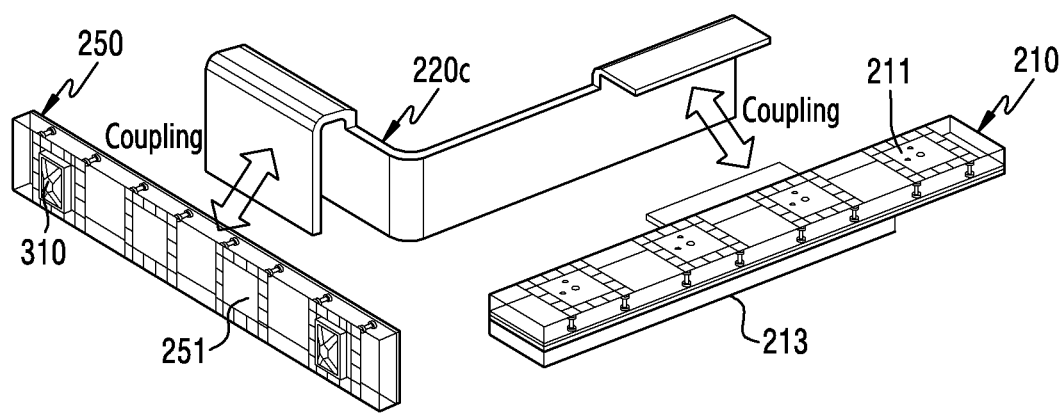
FIG. 10B illustrates an antenna structure including a key structure coupled with a connection member according to an embodiment.

FIG. 10A illustrates an antenna structure 250 including a key structure 310 and coupled to a connection member 220c according to an embodiment. FIG. 10B illustrates an antenna structure 250 including a key structure 310 and coupled to a connection member 220c according to an embodiment.

Referring to FIGS. 10A and 10B, a key structure 310 may be provided in the antenna structure 250 including second antenna elements 251.

According to an embodiment, a mmWave antenna module 210 coupled to the connection member 220c may be provided with first antenna elements 211 and an RFIC 213. In an example, the connection member 220c may have a shape in which the first antenna structure and the second antenna structure may be disposed to form beams in different directions. For example, the connection member 220c may have a shape including a plurality of surfaces at least some of which are or may be perpendicular to each other.

According to an embodiment, in the antenna structure 250 coupled to the connection member 220c, the second antenna elements 251 and at least one key structure 310 provided on at least some of the second antenna elements 251. In an example, when viewed from above the second antenna elements 251, the key structure 310 may overlap at least one of the second antenna elements 251. For example, the key structure 310 may be smaller than the area of at least one of the second antenna elements 251.

According to an embodiment, the antenna structure 250 may be coupled to the connection member 220c without the second coupling unit 252.

According to an embodiment, at least one mmWave antenna module 210 may be coupled to the connection member 220c via the first coupling unit 212.

Figure 10C:
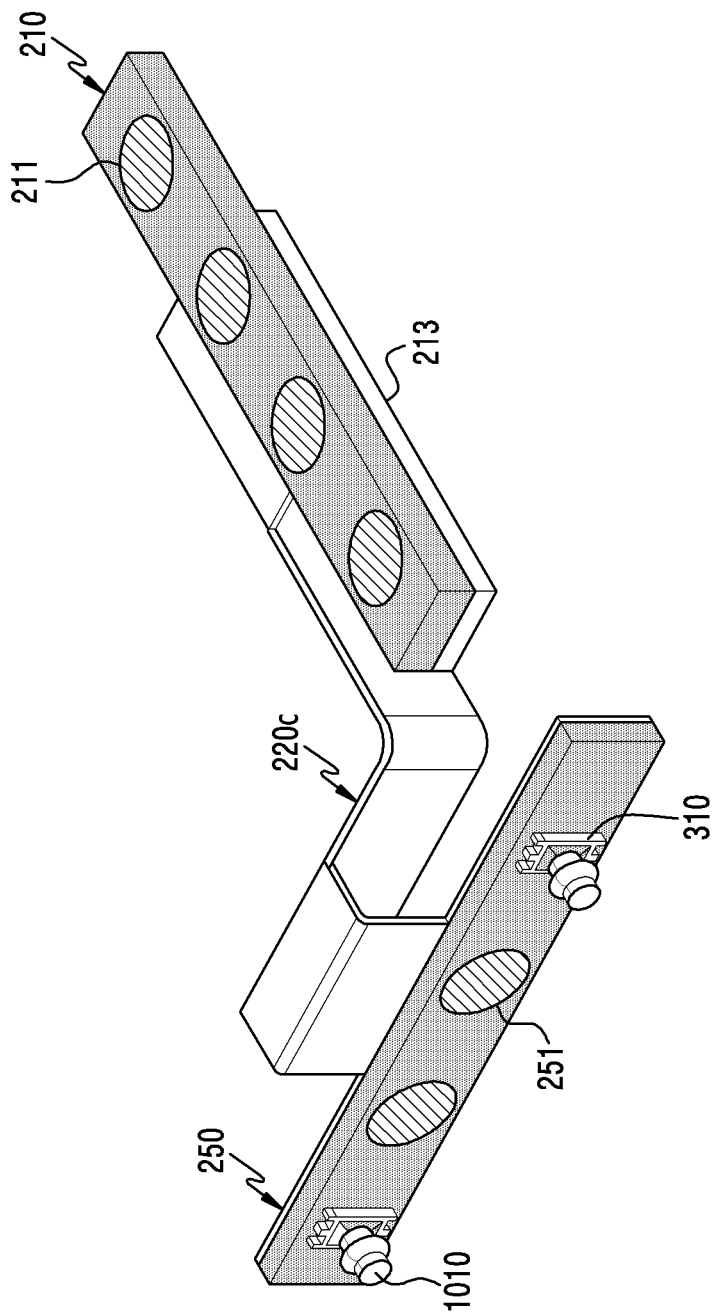
FIG. 10C illustrates an antenna structure including a key connection unit coupled with a connection member according to an embodiment.

FIG. 10C illustrates an antenna structure 250 including a key connection unit 1010 coupled to a connection member 220c according to an embodiment.

Referring to FIG. 10C, the antenna structure 250 coupled to the connection member 220c may include a key connection unit 1010.

According to an embodiment, the antenna structure 250 coupled to the connection member 220c may be provided with a key structure 310, and the key structure 310 may be coupled to the key connection unit 1010. In an example, the antenna structure 250 may be provided with key connection units 1010 as many as the number of key structures 310.

Figure 10D:
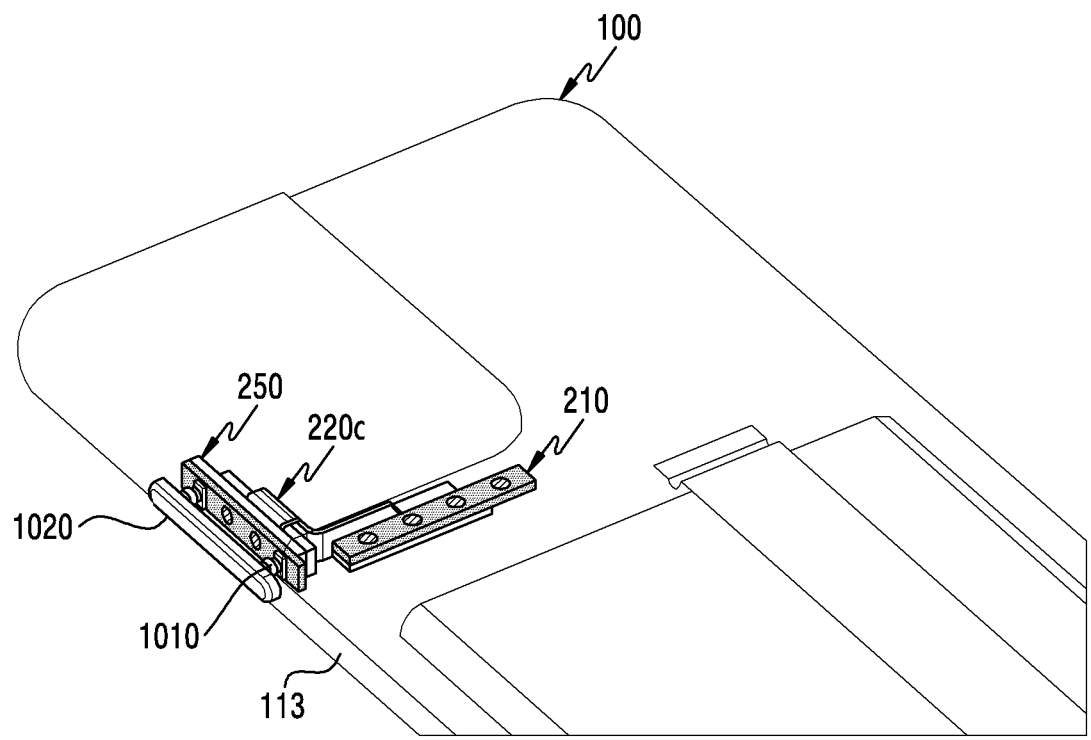
FIG. 10D illustrates a state in which an antenna structure including a key coupled with a connection member is disposed in an electronic device according to an embodiment.
Figure 10E:
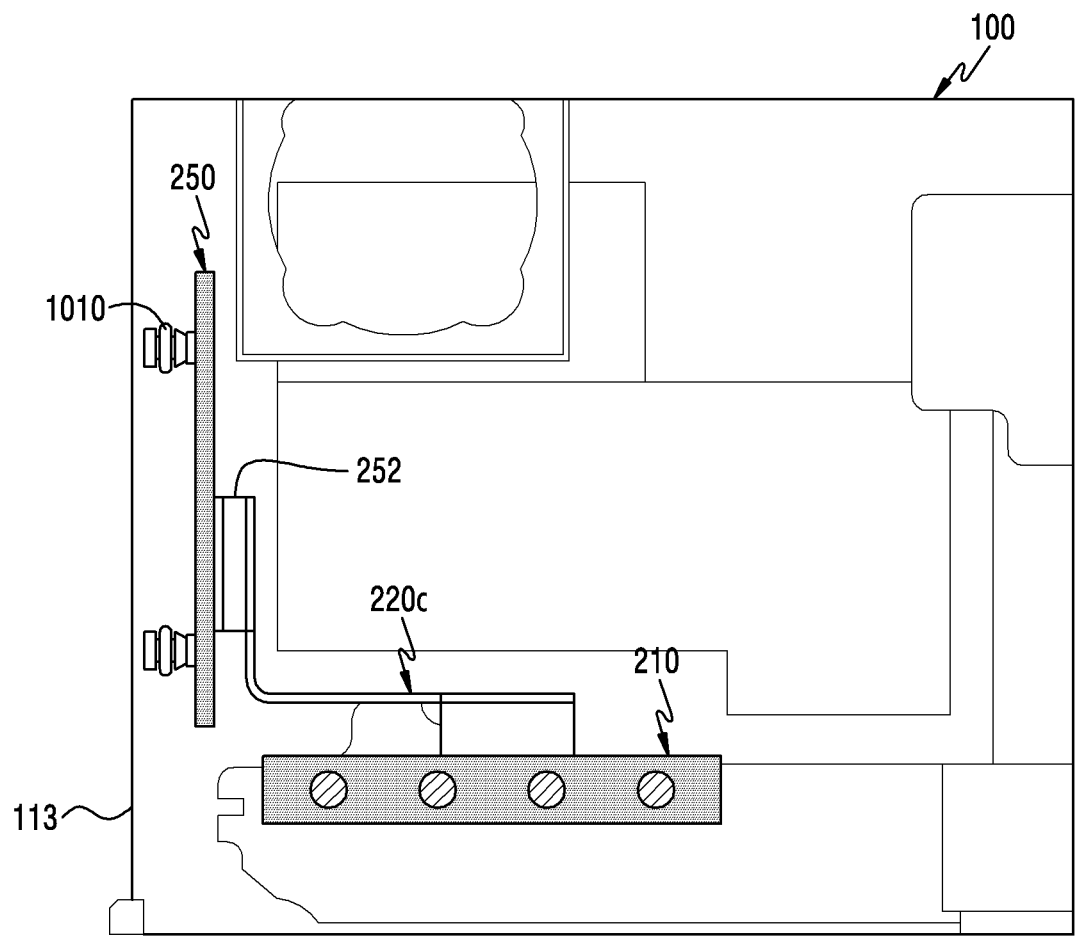
FIG. 10E illustrates a state in which an antenna structure including a key coupled with a connection member is disposed in an electronic device according to an embodiment.

FIG. 10D illustrates a state in which an antenna structure 250 including a key 1020 is disposed in an electronic device 100 according to an embodiment. FIG. 10E illustrates a state in which an antenna structure 250 including a key (not illustrated) is disposed in an electronic device 100 according to an embodiment.

Referring to FIGS. 10D and 10E, the antenna structure 250 to which the key 1020 is coupled and the mmWave antenna module 210 connected to the antenna structure 250 via the connection member 220c may be disposed in at least one region of the electronic device 100. According to an embodiment, the antenna structure 250 and the mmWave antenna module 210 may be disposed to form beam patterns in different directions. For example, the antenna structure 250 may be disposed to form a beam pattern in a direction in which the side member 113 of the electronic device 100 is oriented, and the mmWave antenna module 210 may be disposed to form a beam pattern in a direction in which the rear plate 112 of the electronic device 100 is oriented.

According to an embodiment, the key 1020 may be connected to the antenna structure 250 by being coupled to the key connection unit 1010 provided in the antenna structure 250.

According to an embodiment, the key 1020 may be provided in a direction in which the side member 113 of the electronic device 100 is oriented. In an example, the key 1020 may be disposed to be parallel to the antenna structure 250. In one embodiment, the key 1020 is disposed on the side of the electronic device. The key 1020 may be used to selectively toggle the operational state of the antenna structure 250. For example, a user may depress the key on the side of the electronic device to selectively toggle the operational state of the antenna structure 250.

Figure 11:
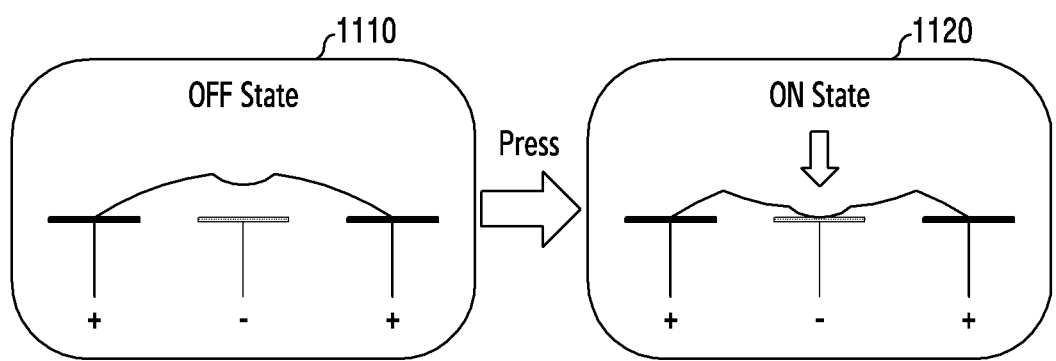
FIG. 11 illustrates ground connections according to ON and OFF states of a key according to an embodiment.

FIG. 11 illustrates the operating structures (1110 and 1120) of the key when the key is turned ON and the when the key is turned OFF according to an embodiment.

Referring to FIG. 11, the state of a signal line may change between the case in which the key (e.g., the key 1020 in FIG. 10D) is turned OFF (1110) and the case in which the key (e.g., the key 1020 in FIG. 10D) is turned ON (1120).

According to an embodiment, when the state of the key is changed from the state (1110) to the state (1120), the signal line may change from the open state to the short state. In an example, when the key is in the state (1110), the signal line is open and an electrical connection may be formed only between ground regions. In another example, when the key is in the state (1120), the signal line may be shorted since the ground region and the signal line are electrically connected to each other.

Figure 12:
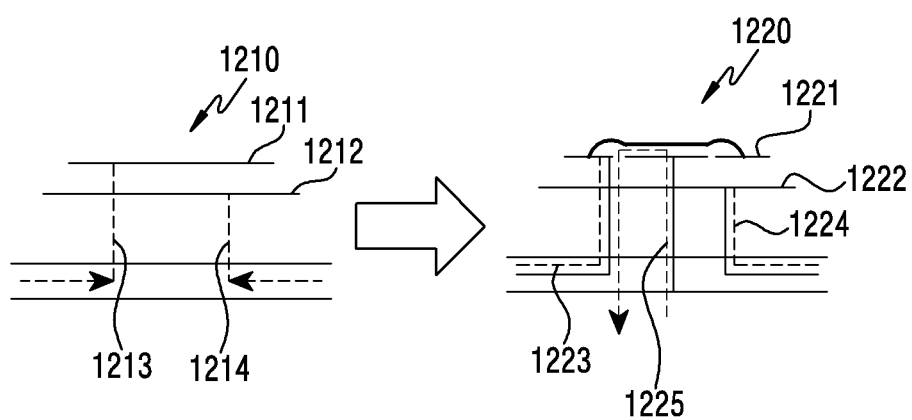
FIG. 12 illustrates signal paths according to ON and OFF states of a key according to an embodiment.

FIG. 12 illustrates signal paths 1210 and 1220 when the key is turned ON and when the key is turned OFF according to an embodiment.

Referring to FIG. 12, an antenna structure may be provided differently depending on whether a key structure is included (1210) or whether a key structure is included (1220).

According to an embodiment, in the antenna structure 1210, a first antenna element 1211 supporting a first frequency band (e.g., a high band (HB)) and a second antenna element 1212 supporting a second frequency band (e.g., a low band (LB)) may be electrically connected to a first feed line 1213, and the second antenna element 1212 may be electrically connected to the second feed line 1214.

According to an embodiment, the antenna structure 1220 may include a third antenna element 1221 supporting a first frequency band (e.g., a high band (HB)) and a fourth antenna element 1222 supporting a second frequency band (e.g., a low band (LB)). The third antenna element 1221 may be electrically connected to the third feed line 1223, and the fourth antenna element 1222 may be electrically connected to the fourth feed line 1224. In an embodiment, a key structure (e.g., the key structure 310) may be provided by using the third antenna element 1221. The third antenna element 1221 may include a first portion electrically connected to the signal line 1225 of the key and a second portion electrically connected to ground.

Figure 13:
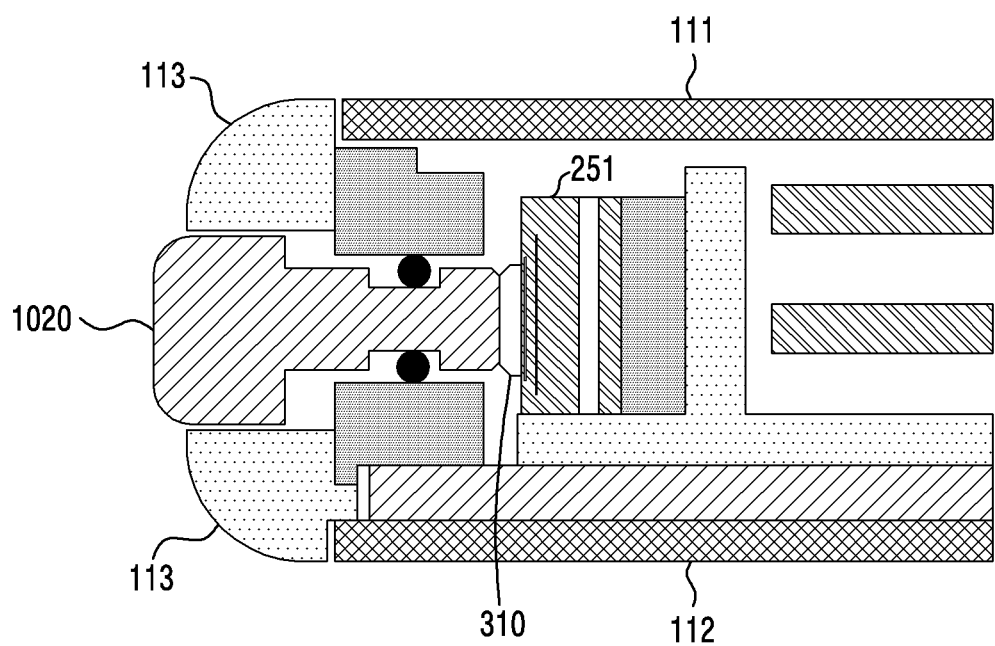
FIG. 13 is a cross-sectional side view of an electronic device including a key according to an exemplary embodiment.

FIG. 13 is a side perspective view of an electronic device 100 including a key 1020 according to an embodiment.

Referring to FIG. 13, the key 1020 may be provided on at least a portion of a side member 113.

According to an embodiment, at least some of first antenna elements 211, which are provided in at least a portion of an internal space of the electronic device 100 defined by the front plate 111 and the rear plate 112 of the electronic device 100, may be provided with a key structure 310.

According to an embodiment, the key 1020 extending in the direction of the side member 113 while at least partially being in contact with the key structure 310 may be electrically connected to the first antenna elements 211.

Figure 14:
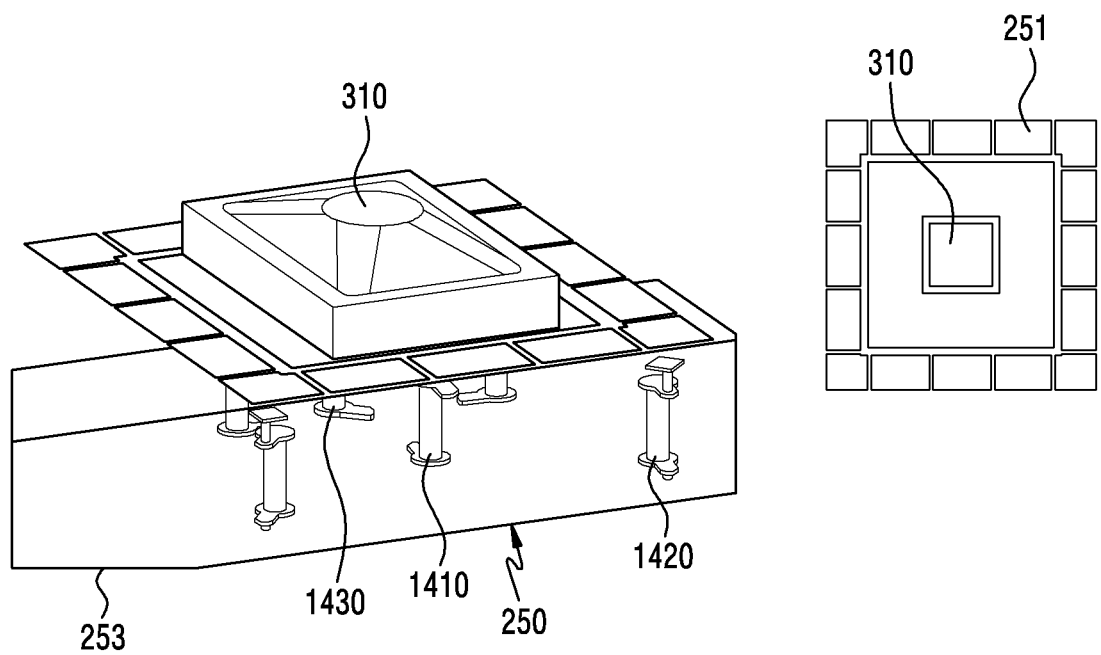
FIG. 14 is a perspective view of an electronic device including a key dome according to an embodiment.

FIG. 14 is a perspective view of an electronic device 100 including a key structure 310 according to an embodiment.

Referring to FIG. 14, a key structure 310 may be provided on at least one of first antenna elements (not shown) provided on one surface of at least one mmWave antenna module (not shown).

According to an embodiment, the antenna structure 250 may be provided with various vias for connection with the key structure 310. In an example, the antenna structure 250 may be provided with an RF via 1410 for transmitting an RF signal. In another example, the antenna structure 250 may be provided with a ground via 1420 for connecting the key structure 310 to the ground of the second antenna PCB 253. In another example, the antenna structure 250 may be provided with a key signal via 1430 for transmitting a key signal to the key structure 310.

Figure 15:
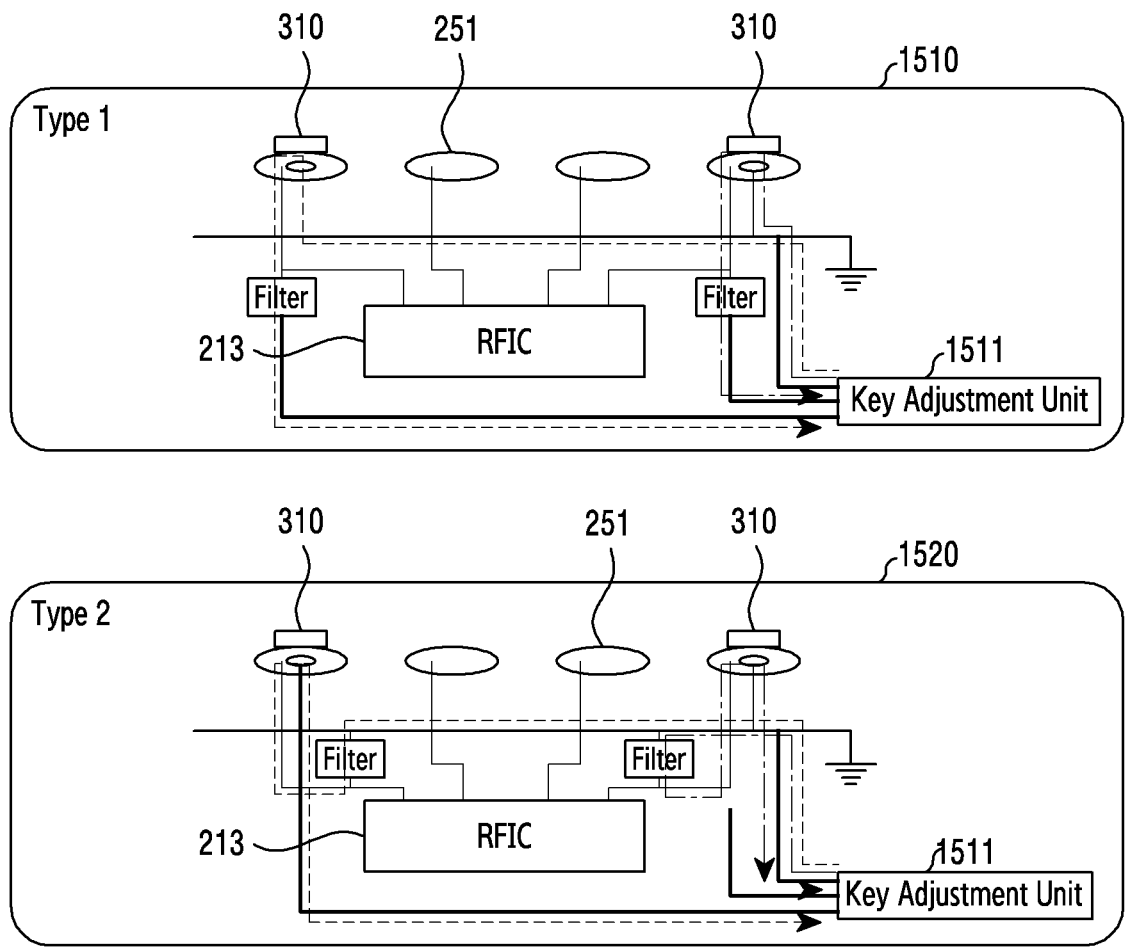
FIG. 15 illustrates a key signal path and a feed path of a mmWave antenna module according to an embodiment.

FIG. 15 illustrates a key signal path and a feed path of a mmWave antenna module 210 according to an embodiment.

Referring to FIG. 15, a key adjustment unit 1511 may adjust key structures 310 via various paths. In one embodiment, the key adjustment unit 1511 is electrically connected to the key structure 310 and is configured to selectively ground the key structure 310, thereby adjusting the operation state of the antenna structure. In one embodiment, the key adjustment unit 1511 includes the key 1020, shown in FIG. 10D.

According to an embodiment, when the electrical path is configured as Type 1 (1510), one point of second antenna elements 251 are connected to a ground, and a key input may be identified according to a connection between a signal and the ground connected via a filter. In an example, the filter may be an RF block filter to which only a DC component is connected and which prevents a mmWave signal from passing therethrough. According to an embodiment, when the electrical path is configured as in Type 2 (1520), one point of the second antenna elements 251 are connected to the key adjustment unit 1511, and the key structure 310 may be adjusted by grounding a feed line of a mmWave signal and a key signal path via a filter. In an example, the filter may be an RF block filter to which only a DC component is connected and which prevents a mmWave signal from passing therethrough.

Figure 16:
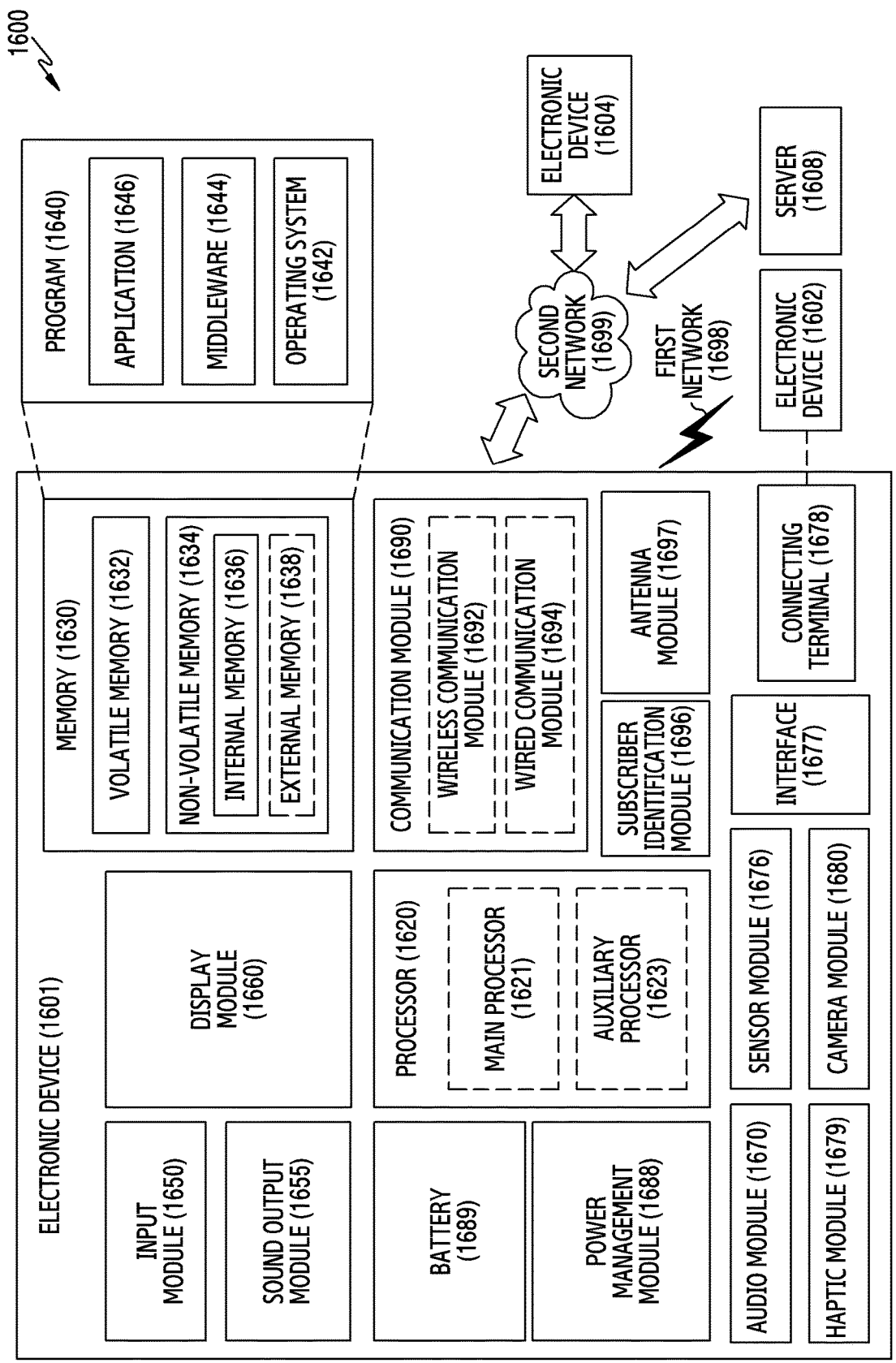
FIG. 16 is a block diagram of an electronic device according to various embodiments in a network environment.

FIG. 16 is a block diagram illustrating an electronic device 1601 in a network environment 1600 according to various embodiments. Referring to FIG. 16, the electronic device 1601 in the network environment 1600 may communicate with an electronic device 1602 via a first network 1698 (e.g., a short-range wireless communication network), or at least one of an electronic device 1604 or a server 1608 via a second network 1699 (e.g., a long-range wireless communication network). According to an embodiment, the electronic device 1601 may communicate with the electronic device 1604 via the server 1608. According to an embodiment, the electronic device 1601 may include a processor 1620, memory 1630, an input module 1650, a sound output module 1655, a display module 1660, an audio module 1670, a sensor module 1676, an interface 1677, a connecting terminal 1678, a haptic module 1679, a camera module 1680, a power management module 1688, a battery 1689, a communication module 1690, a subscriber identification module (SIM) 1696, or an antenna module 1697. In some embodiments, at least one of the components (e.g., the connecting terminal 1678) may be omitted from the electronic device 1601, or one or more other components may be added in the electronic device 1601. In some embodiments, some of the components (e.g., the sensor module 1676, the camera module 1680, or the antenna module 1697) may be implemented as a single component (e.g., the display module 1660).

The processor 1620 may execute, for example, software (e.g., a program 1640) to control at least one other component (e.g., a hardware or software component) of the electronic device 1601 coupled with the processor 1620, and may perform various data processing or computation. According to one embodiment, as at least part of the data processing or computation, the processor 1620 may store a command or data received from another component (e.g., the sensor module 1676 or the communication module 1690) in volatile memory 1632, process the command or the data stored in the volatile memory 1632, and store resulting data in non-volatile memory 1634. According to an embodiment, the processor 1620 may include a main processor 1621 (e.g., a central processing unit (CPU) or an application processor (AP)), or an auxiliary processor 1623 (e.g., a graphics processing unit (GPU), a neural processing unit (NPU), an image signal processor (ISP), a sensor hub processor, or a communication processor (CP)) that is operable independently from, or in conjunction with, the main processor 1621. For example, when the electronic device 1601 includes the main processor 1621 and the auxiliary processor 1623, the auxiliary processor 1623 may be adapted to consume less power than the main processor 1621, or to be specific to a specified function. The auxiliary processor 1623 may be implemented as separate from, or as part of the main processor 1621.

The auxiliary processor 1623 may control at least some of functions or states related to at least one component (e.g., the display module 1660, the sensor module 1676, or the communication module 1690) among the components of the electronic device 1601, instead of the main processor 1621 while the main processor 1621 is in an inactive (e.g., sleep) state, or together with the main processor 1621 while the main processor 1621 is in an active state (e.g., executing an application). According to an embodiment, the auxiliary processor 1623 (e.g., an image signal processor or a communication processor) may be implemented as part of another component (e.g., the camera module 1680 or the communication module 1690) functionally related to the auxiliary processor 1623. According to an embodiment, the auxiliary processor 1623 (e.g., the neural processing unit) may include a hardware structure specified for artificial intelligence model processing. An artificial intelligence model may be generated by machine learning. Such learning may be performed, e.g., by the electronic device 1601 where the artificial intelligence is performed or via a separate server (e.g., the server 1608). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1630 may store various data used by at least one component (e.g., the processor 1620 or the sensor module 1676) of the electronic device 1601. The various data may include, for example, software (e.g., the program 1640) and input data or output data for a command related thererto. The memory 1630 may include the volatile memory 1632 or the non-volatile memory 1634.

The program 1640 may be stored in the memory 1630 as software, and may include, for example, an operating system (OS) 1642, middleware 1644, or an application 1646.

The input module 1650 may receive a command or data to be used by another component (e.g., the processor 1620) of the electronic device 1601, from the outside (e.g., a user) of the electronic device 1601. The input module 1650 may include, for example, a microphone, a mouse, a keyboard, a key (e.g., a button), or a digital pen (e.g., a stylus pen).

The sound output module 1655 may output sound signals to the outside of the electronic device 1601. The sound output module 1655 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1660 may visually provide information to the outside (e.g., a user) of the electronic device 1601. The display module 1660 may include, for example, a display, a hologram device, or a projector and control circuitry to control a corresponding one of the display, hologram device, and projector. According to an embodiment, the display module 1660 may include a touch sensor adapted to detect a touch, or a pressure sensor adapted to measure the intensity of force incurred by the touch.

The audio module 1670 may convert a sound into an electrical signal and vice versa. According to an embodiment, the audio module 1670 may obtain the sound via the input module 1650, or output the sound via the sound output module 1655 or a headphone of an external electronic device (e.g., an electronic device 1602) directly (e.g., wiredly) or wirelessly coupled with the electronic device 1601.

The sensor module 1676 may detect an operational state (e.g., power or temperature) of the electronic device 1601 or an environmental state (e.g., a state of a user) external to the electronic device 1601, and then generate an electrical signal or data value corresponding to the detected state. According to an embodiment, the sensor module 1676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the external electronic device (e.g., the electronic device 1602) directly (e.g., wiredly) or wirelessly. According to an embodiment, the interface 1677 may include, for example, a high definition multimedia interface (HDMI), a universal serial bus (USB) interface, a secure digital (SD) card interface, or an audio interface.

A connecting terminal 1678 may include a connector via which the electronic device 1601 may be physically connected with the external electronic device (e.g., the electronic device 1602). According to an embodiment, the connecting terminal 1678 may include, for example, a HDMI connector, a USB connector, a SD card connector, or an audio connector (e.g., a headphone connector).

The haptic module 1679 may convert an electrical signal into a mechanical stimulus (e.g., a vibration or a movement) or electrical stimulus which may be recognized by a user via his tactile sensation or kinesthetic sensation. According to an embodiment, the haptic module 1679 may include, for example, a motor, a piezoelectric element, or an electric stimulator.

The camera module 1680 may capture a still image or moving images. According to an embodiment, the camera module 1680 may include one or more lenses, image sensors, image signal processors, or flashes.

The power management module 1688 may manage power supplied to the electronic device 1601. According to one embodiment, the power management module 1688 may be implemented as at least part of, for example, a power management integrated circuit (PMIC).

The battery 1689 may supply power to at least one component of the electronic device 1601. According to an embodiment, the battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the electronic device 1602, the electronic device 1604, or the server 1608) and performing communication via the established communication channel. The communication module 1690 may include one or more communication processors that are operable independently from the processor 1620 (e.g., the application processor (AP)) and supports a direct (e.g., wired) communication or a wireless communication. According to an embodiment, the communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device via the first network 1698 (e.g., a short-range communication network, such as Bluetooth™, wireless-fidelity (Wi-Fi) direct, or infrared data association (IrDA)) or the second network 1699 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1692 may identify and authenticate the electronic device 1601 in a communication network, such as the first network 1698 or the second network 1699, using subscriber information (e.g., international mobile subscriber identity (IMSI)) stored in the subscriber identification module 1696.

The wireless communication module 1692 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1692 may support a high-frequency band (e.g., the mmWave band) to achieve, e.g., a high data transmission rate. The wireless communication module 1692 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1692 may support various requirements specified in the electronic device 1601, an external electronic device (e.g., the electronic device 1604), or a network system (e.g., the second network 1699). According to an embodiment, the wireless communication module 1692 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1697 may transmit or receive a signal or power to or from the outside (e.g., the external electronic device) of the electronic device 1601. According to an embodiment, the antenna module 1697 may include an antenna including a radiating element composed of a conductive material or a conductive pattern formed in or on a substrate (e.g., a printed circuit board (PCB)). According to an embodiment, the antenna module 1697 may include a plurality of antennas (e.g., array antennas). In such a case, at least one antenna appropriate for a communication scheme used in the communication network, such as the first network 1698 or the second network 1699, may be selected, for example, by the communication module 1690 (e.g., the wireless communication module 1692) from the plurality of antennas.

The signal or the power may then be transmitted or received between the communication module 1690 and the external electronic device via the selected at least one antenna. According to an embodiment, another component (e.g., a radio frequency integrated circuit (RFIC)) other than the radiating element may be additionally formed as part of the antenna module 1697.

According to various embodiments, the antenna module 1697 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1601 and the external electronic device 1604 via the server 1608 coupled with the second network 1699. Each of the electronic devices 1602 or 1604 may be a device of a same type as, or a different type, from the electronic device 1601. According to an embodiment, all or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1601. The electronic device 1601 may provide the outcome, with or without further processing of the outcome, as at least part of a reply to the request. To that end, a cloud computing, distributed computing, mobile edge computing (MEC), or client-server computing technology may be used, for example. The electronic device 1601 may provide ultra low-latency services using, e.g., distributed computing or mobile edge computing. In another embodiment, the external electronic device 1604 may include an internet-of-things (IoT) device. The server 1608 may be an intelligent server using machine learning and/or a neural network. According to an embodiment, the external electronic device 1604 or the server 1608 may be included in the second network 1699. The electronic device 1601 may be applied to intelligent services (e.g., smart home, smart city, smart car, or healthcare) based on 5G communication technology or IoT-related technology.

An electronic device 100 according to various embodiments includes: a mmWave antenna module 210 including a plurality of first antenna elements 211 disposed on a first surface that is oriented in a first direction, a first coupling unit 212 that protrudes in a second direction from a second surface that is perpendicular to the first surface and is oriented in the second direction, and an RFIC 213 disposed on a third surface oriented in a third direction opposite to the first direction; an antenna structure 250 including a plurality of second antenna elements 251 and a second coupling unit 252 protruding from one surface of the antenna structure; a connection member 220 electrically connected to the first coupling unit 212 and/or the second coupling unit 252; a main PCB 230 electrically connected to the mmWave antenna module 210; and a wireless communication circuit 240 disposed on the main PCB 230, wherein the antenna structure 250 may be electrically connected to the mmWave antenna module 210 via the connection member 220, and the wireless communication circuit 240 may be configured to perform wireless communication by using at least one of the mmWave antenna module 210 or the antenna structure 250.

According to an embodiment, the mmWave antenna module may include conductive layers and insulating layers that are alternatively stacked, the plurality of first antenna elements may be disposed on a first conductive layer, and the coupling unit may be configured since at least a second conductive layer spaced apart from the first conductive layer protrudes from the second surface in the second direction.

According to an embodiment, the first coupling unit may include a plurality of conductive terminals, and at least some of the plurality of conductive terminals may be electrically connected to the plurality of first antenna elements or the RFIC via wires in the second conductive layers.

According to an embodiment, the first coupling unit may include the second conductive layer and a third conductive layer, and a first terminal of the first coupling unit may be electrically connected to a first wire provided in the second conductive layer, and a second terminal may be electrically connected to a second wire provided in the third conductive layer via a conductive via provided from the second conductive layer to the third conductive layer.

According to an embodiment, the plurality of first antenna elements or the plurality of second antenna elements may be conductive patches.

According to an embodiment, the plurality of first antenna elements or the plurality of second antenna elements may be dipole antennas.

According to an embodiment, the display device may further include a display oriented in the third direction, wherein the first direction may be directed to the rear surface of the electronic device.

According to an embodiment, the electronic device may further include a side member oriented in the second direction.

According to an embodiment, the antenna structure may further include a key structure.

According to an embodiment, the connection member may be an FPCB.

According to an embodiment, the connection member may have a shape including at least two surfaces that are perpendicular to each other.

According to an embodiment, the connection member may include a plurality of wires.

According to an embodiment, the plurality of wires may include an electrical path connected to a ground region.

According to an embodiment, the plurality of wires may be electrically connected to the mmWave antenna module via a plurality of connection points provided in the first coupling unit.

According to an embodiment, the plurality of wires may be disposed on a plurality of layers.

An electronic device 100 according to various embodiments includes: a mmWave antenna module 210 including a plurality of second antenna elements 211, a first coupling unit 212 protruding from one surface, and an RFIC 213; an antenna structure 250 including: a plurality of second antenna elements 251 disposed on a first surface that is oriented in a first direction, a second coupling unit 252 that protrudes in a second direction from a second surface that is perpendicular to the first surface and is oriented in the second direction, and a key structure 310 disposed on the first surface; a connection member 220 electrically connected to the first coupling unit 212 and/or the second coupling unit 252; a main PCB 230 electrically connected to the mmWave antenna module 210; and a wireless communication circuit 240 disposed on the main PCB, wherein the antenna structure 250 may be electrically connected to the mmWave antenna module 210 via the connection member 220, and the wireless communication circuit 240 may be configured to perform wireless communication by using at least one of the mmWave antenna module 210 or the antenna structure 250.

According to an embodiment, the key structure may be disposed to at least partially overlap the plurality of second antenna elements.

According to an embodiment, the key structure may be disposed between the plurality of second antenna elements.

According to an embodiment, the plurality of first antenna elements or the plurality of second antenna elements may be conductive patches.

According to an embodiment, the plurality of first antenna elements or the plurality of second antenna elements may be dipole antennas.

According to an embodiment, the electronic device may include a key adjustment unit electrically connected to the key structure, wherein the key adjustment unit is configured to selectively ground the key structure.

According to an embodiment, the key adjustment unit includes a key disposed on a side of the electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1640) including one or more instructions that are stored in a storage medium (e.g., internal memory 1636 or external memory 1638) that is readable by a machine (e.g., the electronic device 1601). For example, a processor (e.g., the processor 1620) of the machine (e.g., the electronic device 1601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a mmWave antenna module including:
a plurality of first antenna elements disposed on a first surface oriented in a first direction;
a first coupling unit that protrudes in a second direction from a second surface that is perpendicular to the first surface and is oriented in the second direction; and
a radio frequency integrated circuit (RFIC) disposed on a third surface oriented in a third direction opposite to the first direction;
an antenna structure including:
a plurality of second antenna elements; and
a second coupling unit protruding from one surface of the antenna structure;
a connection member electrically connected to at least one of the first coupling unit and the second coupling unit;
a main printed circuit board (PCB) electrically connected to the mmWave antenna module; and
a wireless communication circuit disposed on the main PCB,
wherein the antenna structure is electrically connected to the mmWave antenna module via the connection member, and
wherein the wireless communication circuit is configured to perform wireless communication by using at least one of the mmWave antenna module and the antenna structure.

2. The electronic device of claim 1, wherein the mmWave antenna module includes conductive layers and insulating layers that are alternately stacked,
the plurality of first antenna elements are disposed on a first conductive layer, and
a second conductive layer is spaced apart from the first conductive layer and protrudes from the second surface in the second direction.

3. The electronic device of claim 2, wherein the first coupling unit includes a plurality of conductive terminals, and
at least two of the plurality of conductive terminals are electrically connected to the plurality of first antenna elements or the RFIC via wires in the second conductive layers.

4. The electronic device of claim 2, wherein the first coupling unit includes the second conductive layer and a third conductive layer, and
a first terminal of the first coupling unit is electrically connected to a first wire provided in the second conductive layer, and a second terminal is electrically connected to a second wire provided in the third conductive layer by a conductive via provided from the second conductive layer to the third conductive layer.

5. The electronic device of claim 1, wherein at least one of the plurality of first antenna elements and the plurality of second antenna elements are conductive patches.

6. The electronic device of claim 1, wherein at least one of the plurality of first antenna elements and the plurality of second antenna elements are dipole antennas.

7. The electronic device of claim 1, further comprising:
a display oriented in the third direction,
wherein the first direction is directed to the rear surface of the electronic device.

8. The electronic device of claim 1, further comprising:
a side member oriented in the second direction.

9. The electronic device of claim 1, wherein the antenna structure further includes a key structure.

10. The electronic device of claim 1, wherein the connection member is an flexible printed circuit board (FPCB).

11. The electronic device of claim 1, wherein the connection member has a shape including at least two surfaces that are perpendicular to each other.

12. The electronic device of claim 11, wherein the connection member includes a plurality of wires.

13. The electronic device of claim 12, wherein the plurality of wires include an electrical path connected to a ground region.

14. The electronic device of claim 12, wherein the plurality of wires are electrically connected to the mmWave antenna module via a plurality of connection points provided in the first coupling unit.

15. The electronic device of claim 12, wherein the plurality of wires are disposed on a plurality of layers.

16. An electronic device comprising:
a mmWave antenna module including:
a plurality of first antenna elements;
a first coupling unit protruding from one surface of the mmWave antenna module; and
a radio frequency integrated circuit (RFIC);
an antenna structure including:
a plurality of second antenna elements disposed on a first surface oriented in a first direction;
a second coupling unit that protrudes in a second direction from a second surface that is perpendicular to the first surface and is oriented in the second direction; and
a key structure disposed on the first surface;
a connection member electrically connected to at least one of the first coupling unit and the second coupling unit;
a main printed circuit board (PCB) electrically connected to the mmWave antenna module; and
a wireless communication circuit disposed on the main PCB,
wherein the antenna structure is electrically connected to the mmWave antenna module via the connection member, and
the wireless communication circuit is configured to perform wireless communication by using at least one of the mmWave antenna module and the antenna structure.

17. The electronic device of claim 16, wherein the key structure is disposed to at least partially overlap the plurality of second antenna elements.

18. The electronic device of claim 16, wherein the key structure is disposed between the plurality of second antenna elements.

19. The electronic device of claim 16, wherein at least one of the plurality of first antenna elements and the plurality of second antenna elements are conductive patches.

20. The electronic device of claim 16, wherein at least one of the plurality of first antenna elements and the plurality of second antenna elements are dipole antennas.

21. The electronic device of claim 16, further comprising:
a key adjustment unit electrically connected to the key structure, wherein the key adjustment unit is configured to selectively ground the key structure.

22. The electronic device of claim 21, wherein the key adjustment unit includes a key disposed on a side of the electronic device.

* * * * *